ись

(12) United States Patent
Suzuki et al.

(10) Patent No.: US 7,876,387 B2
(45) Date of Patent: Jan. 25, 2011

(54) LATERAL ELECTRIC FIELD TYPE LIQUID CRYSTAL DISPLAY DEVICE

(75) Inventors: Teruaki Suzuki, Kanagawa (JP); Hideki Itou, Kanagawa (JP); Sounosuke Takahashi, Kanagawa (JP); Shinichi Nishida, Kanagawa (JP); Yoshikazu Sakaguchi, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 202 days.

(21) Appl. No.: 12/349,145

(22) Filed: Jan. 6, 2009

(65) Prior Publication Data
US 2009/0185090 A1    Jul. 23, 2009

(30) Foreign Application Priority Data

Jan. 18, 2008   (JP)   ............................. 2008-009919
Nov. 7, 2008    (JP)   ............................. 2008-287219

(51) Int. Cl.
*G02F 1/1343*   (2006.01)
(52) U.S. Cl. ...................... 349/38; 349/39; 349/141; 349/142
(58) Field of Classification Search ............ 349/38–39, 349/141–142
See application file for complete search history.

(56) References Cited

U.S. PATENT DOCUMENTS

2007/0252937 A1* 11/2007 Suzuki et al. ............... 349/141

FOREIGN PATENT DOCUMENTS

| JP | 2000-029014 | 1/2000 |
| JP | 2000-089240 | 3/2000 |
| JP | 2002-082630 | 3/2002 |
| JP | 2004-062145 | 2/2004 |

* cited by examiner

*Primary Examiner*—David Nelms
*Assistant Examiner*—Phu Vu
(74) *Attorney, Agent, or Firm*—Young & Thompson

(57) ABSTRACT

A lateral electric field type LCD device makes it possible to increase the degree of freedom in designing the constituent elements thereof and to improve the aperture ratio easily compared with the related-art LCD structure. The drain bus lines are entirely covered with the at least one first liquid crystal driving electrode (e.g., the common electrode). The gate bus line corresponding to each pixel region is covered with the at least one first liquid crystal driving electrode except for a predetermined non-overlapped area existing in a part that does not overlap with the corresponding TFT. The predetermined non-overlapped area of the gate bus line corresponding to each pixel region is covered with the storage capacitor electrode corresponding to the adjacent pixel region. Preferably, the at least one first liquid crystal driving electrode comprises openings that expose the channel regions of the TFTs, respectively.

9 Claims, 18 Drawing Sheets

| | |
|---|---|
| 142: SOURCE ELECTRODE | 162: CONTACT HOLE |
| 143: SEMICONDUCTOR FILM | 171: PIXEL ELECTRODE |
| 144: DRAIN ELECTRODE | 172: COMMON ELECTRODE |
| 145: THIN-FILM TRANSISTOR | 172b: OPENING |
| 152: COMMON BUS LINE | 173: STORAGE CAPACITOR ELECTRODE |
| 155: GATE BUS LINE | 181: BLACK MATRIX LAYER |
| 156: DRAIN BUS LINE | |

| 142: | SOURCE ELECTRODE | 156: | DRAIN BUS LINE |
| 143: | SEMICONDUCTOR FILM | 162: | CONTACT HOLE |
| 144: | DRAIN ELECTRODE | 171: | PIXEL ELECTRODE |
| 145: | THIN-FILM TRANSISTOR | 172: | COMMON ELECTRODE |
| 152: | COMMON BUS LINE | 172b: | OPENING |
| 155: | GATE BUS LINE | 173: | STORAGE CAPACITOR ELECTRODE |

| | | |
|---|---|---|
| 142: | SOURCE ELECTRODE | 162: CONTACT HOLE |
| 143: | SEMICONDUCTOR FILM | 171: PIXEL ELECTRODE |
| 144: | DRAIN ELECTRODE | 172: COMMON ELECTRODE |
| 145: | THIN-FILM TRANSISTOR | 172b: OPENING |
| 152: | COMMON BUS LINE | 173: STORAGE CAPACITOR ELECTRODE |
| 155: | GATE BUS LINE | 181: BLACK MATRIX LAYER |
| 156: | DRAIN BUS LINE | |

| 142: | SOURCE ELECTRODE | | |
|---|---|---|---|
| 143: | SEMICONDUCTOR FILM | | |
| 144: | DRAIN ELECTRODE | 170: | AUXILIARY PIXEL ELECTRODE |
| 145: | THIN-FILM TRANSISTOR | 171: | PIXEL ELECTRODE |
| 152: | COMMON BUS LINE | 172: | COMMON ELECTRODE |
| 155: | GATE BUS LINE | 172b: | OPENING |
| 156: | DRAIN BUS LINE | 173: | STORAGE CAPACITOR ELECTRODE |
| 161, 162: | CONTACT HOLE | 181: | BLACK MATRIX LAYER |

FIG. 5A
RELATED ART
FIG. 5B
RELATED ART
FIG. 5C
RELATED ART
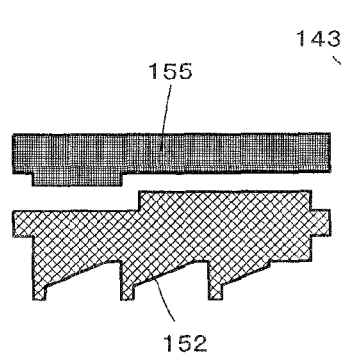
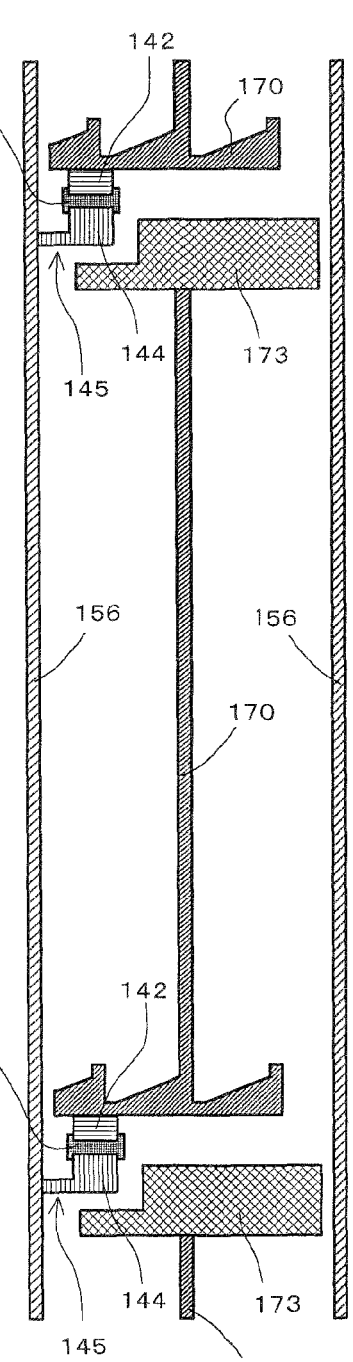
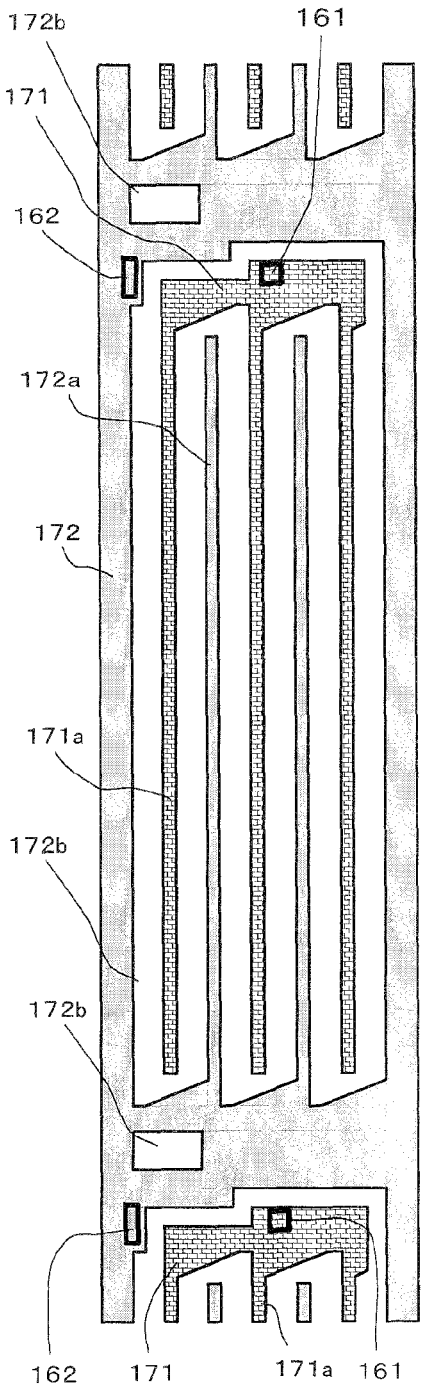
| | |
|---|---|
| 142: | SOURCE ELECTRODE |
| 143: | SEMICONDUCTOR FILM |
| 144: | DRAIN ELECTRODE |
| 145: | THIN-FILM TRANSISTOR |
| 152: | COMMON BUS LINE |
| 155: | GATE BUS LINE |
| 156: | DRAIN BUS LINE |
| 161, 162: | CONTACT HOLE |
| 170: | AUXILIARY PIXEL ELECTRODE |
| 171: | PIXEL ELECTRODE |
| 172: | COMMON ELECTRODE |
| 172b: | OPENING |
| 173: | STORAGE CAPACITOR ELECTRODE |

| 142: | SOURCE ELECTRODE | 161, 162: | CONTACT HOLE |
| --- | --- | --- | --- |
| 143: | SEMICONDUCTOR FILM | 170: | AUXILIARY PIXEL ELECTRODE |
| 144: | DRAIN ELECTRODE | 171: | PIXEL ELECTRODE |
| 145: | THIN-FILM TRANSISTOR | 172: | COMMON ELECTRODE |
| 152: | COMMON BUS LINE | 172b: | OPENING |
| 155: | GATE BUS LINE | 173: | STORAGE CAPACITOR ELECTRODE |
| 156: | DRAIN BUS LINE | 181: | BLACK MATRIX LAYER |

FIG. 8A RELATED ART

CROSS-SECTION ALONG LINE VIIIA-VIIIA

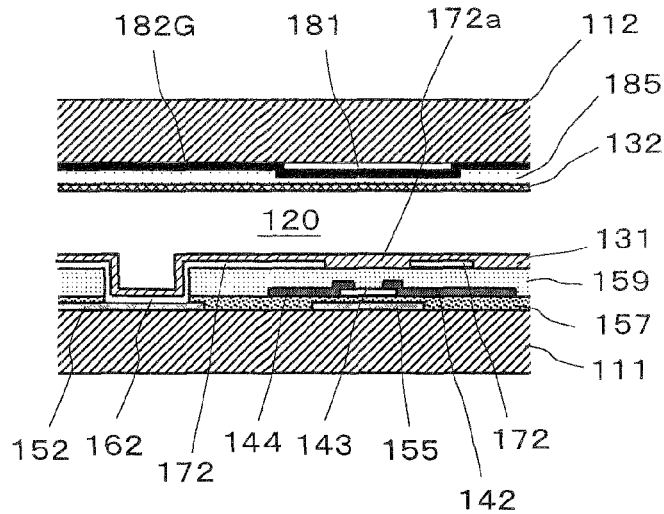

FIG. 8B RELATED ART

CROSS-SECTION ALONG LINE VIIIB-VIIIB

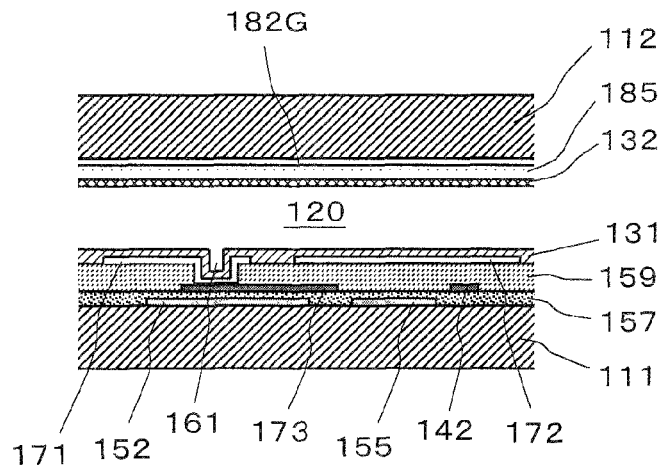

| | | | |
|---|---|---|---|
| 111, 112: | GLASS PLATE | 157: | GATE INSULATING FILM |
| 120: | LIQUID CRYSTAL LAYER | 159: | PROTECTIVE INSULATING FILM |
| 131, 132: | ALIGNMENT FILM | 161, 162: | CONTACT HOLE |
| 142: | SOURCE ELECTRODE | 170: | AUXILIARY PIXEL ELECTRODE |
| 143: | SEMICONDUCTOR FILM | 171: | PIXEL ELECTRODE |
| 144: | DORAIN ELECTRODE | 172: | COMMON ELECTRODE |
| 145: | HIN-FILM TRANSISTOR | 172b: | OPENING |
| 152: | COMMON BUS LINE | 173: | STORAGE CAPACITOR ELECTRODE |
| 155: | GATE BUS LINE | 181: | BLACK MATRIX LAYER |
| 156: | DRAIN BUS LINE | 182G: | GREEN LAYER |
| | | 185: | OVERCOAT LAYER |

142: SOURCE ELECTRODE
143: SEMICONDUCTOR FILM
144: DRAIN ELECTRODE
145: THIN-FILM TRANSISTOR
152: COMMON BUS LINE
155: GATE BUS LINE
156: DRAIN BUS LINE
170: AUXILIARY PIXEL ELECTRODE
173: STORAGE CAPACITOR ELECTRODE

142: SOURCE ELECTRODE
143: SEMICONDUCTOR FILM
144: DRAIN ELECTRODE
145: THIN-FILM TRANSISTOR
152: COMMON BUS LINE
155: GATE BUS LINE
156: DRAIN BUS LINE

170: AUXILIARY PIXEL ELECTRODE
172: COMMON ELECTRODE
173: STORAGE CAPACITOR ELECTRODE

| | |
|---|---|
| 42: SOURCE ELECTRODE | 61,62: CONTACT HOLE |
| 43: SEMICONDUCTOR FILM | 70: AUXILIARY PIXEL ELECTRODE |
| 44: DRAIN ELECTRODE | 71: PIXEL ELECTRODE |
| 45: THIN-FILM TRANSISTOR | 72: COMMON ELECTRODE |
| 52: COMMON BUS LINE | 72b: OPENING |
| 55: GATE BUS LINE | 73: STORAGE CAPACITOR ELECTRODE |
| 56: DRAIN BUS LINE | 81: BLACK MATRIX LAYER |

| 42: | SOURCE ELECTRODE | 56: | DRAIN BUS LINE |
| 43: | SEMICONDUCTOR FILM | 61, 62: | CONTACT HOLE |
| 44: | DRAIN ELECTRODE | 71: | PIXEL ELECTRODE |
| 45: | THIN-FILM TRANSISTOR | 72: | COMMON ELECTRODE |
| 52: | COMMON BUS LINE | 72b: | OPENING |
| 55: | GATE BUS LINE | 73: | STORAGE CAPACITOR ELECTRODE |

| | | | |
|---|---|---|---|
| 42: | SOURCE ELECTRODE | 61, 62: | CONTACT HOLE |
| 43: | SEMICONDUCTOR FILM | 70: | AUXILIARY PIXEL ELECTRODE |
| 44: | DRAIN ELECTRODE | 71: | PIXEL ELECTRODE |
| 45: | THIN-FILM TRANSISTOR | 72: | COMMON ELECTRODE |
| 52: | COMMON BUS LINE | 72b: | OPENING |
| 55: | GATE BUS LINE | 73: | STORAGE CAPACITOR ELECTRODE |
| 56: | DRAIN BUS LINE | 81: | BLACK MATRIX LAYER |

CROSS-SECTION
ALONG LINE XIV-XIV

| 11, 12: | GLASS PLATE | 70: | AUXILIARY PIXEL ELECTRODE |
|---|---|---|---|
| 20: | LIQUID CRYSTAL LAYER | 71: | PIXEL ELECTRODE |
| 31, 32 : | ALIGNMENT FILM | 72: | COMMON ELECTRODE |
| 56: | DRAIN BUS LINE | 82: | COLOR LAYER |
| 57: | GATE INSULATING FILM | 82R: | RED LAYER |
| 59: | PROTECTIVE INSULATING FILM | 82G: | GREEN LAYER |
| | | 82B: | BLUE LAYER |
| | | 85: | OVERCOAT LAYER |

FIG. 15A

CROSS-SECTION ALONG LINE XVA-XVA

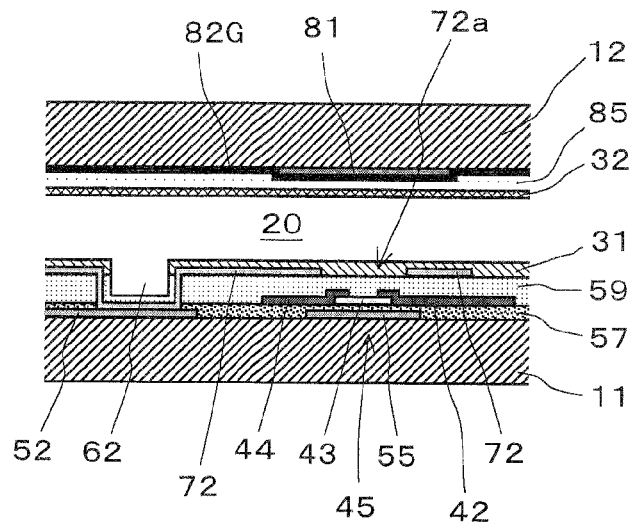

FIG. 15B

CROSS-SECTION ALONG LINE XVB-XVB

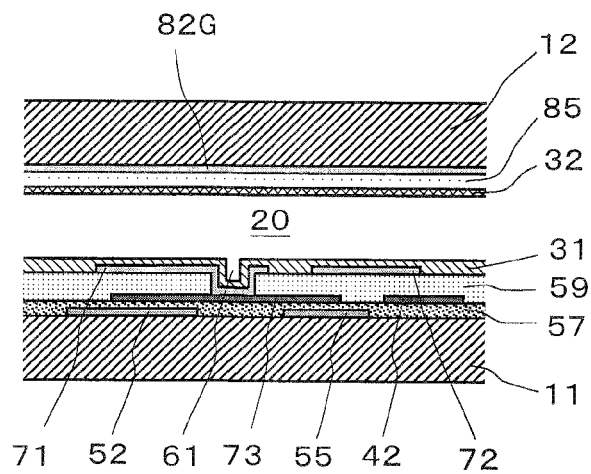

| | | | |
|---|---|---|---|
| 11,12: | GLASS PLATE | 57: | GATE INSULATING FILM |
| 20: | LIQUID CRYSTAL LAYER | 59: | PROTECTIVE INSULATING FILM |
| 31,32: | ALIGNMENT FILM | 61,62: | CONTACT HOLE |
| 42: | SOURCE ELECTRODE | 71: | PIXEL ELECTRODE |
| 43: | SEMICONDUCTOR FILM | 72: | COMMON ELECTRODE |
| 44: | DRAIN ELECTRODE | 73: | STORAGE CAPACITOR ELECTRODE |
| 45: | THIN-FILM TRANSISTOR | 81: | BLACK MATRIX LAYER |
| 52: | COMMON BUS LINE | 82G: | GREEN LAYER |
| 55: | GATE BUS LINE | 85: | OVERCOAT LAYER |

| 42: | SOURCE ELECTRODE | 56: | DRAIN BUS LINE |
| 43: | SEMICONDUCTOR FILM | 70: | AUXILIARY PIXEL ELECTRODE |
| 44: | DRAIN ELECTRODE | 73: | STORAGE CAPACITOR ELECTRODE |
| 45: | THIN-FILM TRANSISTOR | | |
| 52: | COMMON BUS LINE | | |
| 55: | GATE BUS LINE | | |

| 42: | SOURCE ELECTRODE | 56: | DRAIN BUS LINE |
| 43: | SEMICONDUCTOR FILM | 70: | AUXILIARY PIXEL ELECTRODE |
| 44: | DRAIN ELECTRODE | 72: | COMMON ELECTRODE |
| 45: | THIN-FILM TRANSISTOR | 72b: | OPENING |
| 52: | COMMON BUS LINE | 73: | STORAGE CAPACITOR ELECTRODE |
| 55: | GATE BUS LINE | | |

CROSS-SECTION ALONG LINE XVA-XVA

| 11, 12: | GLASS PLATE | 57: | GATE INSULATING FILM |
| 20: | LIQUID CRYSTAL LAYER | 59: | PROTECTIVE INSULATING FILM |
| 31, 32 : | ALIGNMENT FILM | 62: | CONTACT HOLE |
| 42: | SOURCE ELECTRODE | 72: | COMMON ELECTRODE |
| 43: | SEMICONDUCTOR FILM | 72b: | OPENING |
| 44: | DRAIN ELECTRODE | 82R: | RED LAYER |
| 45: | THIN-FILM TRANSISTOR | 82G: | GREEN LAYER |
| 52: | COMMON BUS LINE | 85: | OVERCOAT LAYER |
| 55: | GATE BUS LINE | | |

LATERAL ELECTRIC FIELD TYPE LIQUID CRYSTAL DISPLAY DEVICE

BACKGROUND OF THE INVENTION

1. Field of the Invention

The present invention relates to a Liquid Crystal Display (LCD) device and more particularly, to an active-matrix addressing LCD device of the lateral electric field type, such as the In-Plane Switching (IPS) type. The present invention is applicable to monitors designed for computers using the lateral electric field type LCD device, LCD televisions, portable telephone terminals, Global Positioning System (GPS) terminals, car navigation systems, video game machines, Automatic Teller Machine (ATM) terminals located at banks or convenience stores, medical diagnosis apparatuses, and so on.

2. Description of the Related Art

Generally, the LCD device has the features such as low profile, reduced weight, and low power consumption. In particular, the active-matrix addressing LCD device that drives the respective pixels arranged vertically and horizontally in a matrix array by the active elements has ever been recognized as a high image quality flat-panel display device. Especially, the active-matrix addressing LCD device using thin-film transistors (TFTs) as the active elements for switching the respective pixels has been extensively diffused.

Most of active-matrix addressing LCD devices, which utilizes the electrooptic effects of the TN (Twisted Nematic) type liquid crystal material sandwiched by two substrates, display images by the application of an electric field approximately vertical to the main surfaces of the substrates across the liquid crystal material to thereby cause displacement of the liquid crystal molecules of the said material. These LCD devices are termed the "vertical electric field" type. On the other hand, some of the active-matrix addressing LCD devices display images by the application of an electric field approximately parallel to the main surfaces of the substrates across the liquid crystal material to thereby cause displacement of the liquid crystal molecules of the said material in the planes parallel to the said main surfaces. These LCD devices have been known also, which are termed the "lateral electric field" type. Various improvements have ever been made not only for the vertical electric field type LCD devices but also for the lateral electric field type ones. Some of the improvements made for the latter will be exemplified below.

For example, the Patent Document 1 (Japanese Unexamined Patent Publication No. 2000-089240) published on Mar. 31, 2000 and the Patent Document 2 Japanese Unexamined Patent Publication No. 2004-062145) published on Feb. 26, 2004 disclose lateral electric field type LCD devices, each of which comprises drain bus lines and gate bus lines covered with a common electrode or electrodes in such a way that an interlayer insulating film intervenes between the drain and gate bus lines and the common electrode(s). The structure of the LCD device disclosed in the Patent Document 2 is shown in FIGS. 1, 2A to 2C, and 3.

FIG. 1 is a plan view showing the structure of the active-matrix substrate (i.e., the TFT substrate) of the said LCD device, FIGS. 2A, 2B and 2C are plan views showing the structures of the three layers that constitute the said active-matrix substrate, respectively, and FIG. 3 is an enlarged partial plan view showing the detailed structure of the vicinity of the gate bus line of the said active-matrix substrate. Since all the pixels of the active-matrix addressing LCD device have the same structure, the structure of one pixel is shown in FIGS. 1 to 3.

As clearly shown in FIGS. 2A, 2B and 2C, the active-matrix substrate of the related-art LCD device shown in FIG. 1 comprises gate bus lines 155 and common bus lines 152 formed in the same layer on a transparent insulative plate (e.g., a glass plate)(not shown); drain bus lines 156, pixel electrodes 171, TFTs 145, and storage capacitor electrodes 173 formed in the same layer on a gate insulating film (not shown) that covers the gate and common bus lines 155 and 152; and a common electrode 172 formed on a protective insulating film (not shown) that covers the drain bus lines 156, the pixel electrodes 171, the TFTs 145, and the storage capacitor electrodes 173. It is usual that the pixel electrodes 171 and the common electrode 172 are respectively formed by patterning transparent conductive metal films made of, for example, Indium Tin Oxide (ITO).

The gate bus lines 155 extending in parallel to each other at equal intervals along the lateral (horizontal) direction of FIG. 1 and the drain bus lines 156 extending in parallel to each other at equal intervals along the longitudinal (vertical) direction of the same figure define rectangular regions. Each of these rectangular regions forms a pixel region. These pixel regions (i.e., the pixels) are arranged in a matrix array as a whole. Each of the TFTs 145 is located near one of the intersections formed by the two gate bus lines 155 and the two drain bus lines 156 that define each pixel region (i.e., at the lower left intersection in FIG. 1). Similar to the gate bus lines 155, the common bus lines 152 extend along the lateral direction of the same figure in parallel with the gate bus lines 155. Each of the common bus lines 152 is located at the opposite side to the TFT 145 (i.e., at the upper end in FIG. 1) in the pixel region. In other words, it is placed near one of the two gate bus lines 155 that is located on the distant side from the TFT 145 in the pixel region, (i.e., the gate bus line 155 at the upper position in FIG. 1). Therefore, it may be said that each of the common bus lines 152 is located near the TFTs 145 existing in the preceding pixel regions that are upwardly adjacent thereto along the extension direction of the drain bus lines 156 (i.e., the vertical direction) to be apart from the said TFTs 145.

The drain electrode 144, the source electrode 142, and the semiconductor film 143 of the TFT 145 are respectively formed to have such patterns or shapes as shown in FIG. 2B. The gate electrode (not shown) of the TFT 145 is formed to be united with the gate bus line 155, in other words, the gate electrode is a part of the gate bus line 155. The gate electrode is placed at a position overlapping with the semiconductor film 143 between the drain electrode 144 and the source electrode 142. It is usual that an amorphous silicon film is used as the semiconductor film 143.

The pixel electrode 171 and the common electrode 172, which are provided for generating liquid crystal driving electric field, are formed to have such patterns or shapes as shown in FIGS. 2B and 2C, respectively. Each pixel electrode 171 and the common electrode 172 comprise comb-tooth like parts (i.e., thin belt-shaped parts protruding into the pixel region) 171a and 172a that are mated with each other, respectively. Here, the total number of the comb-tooth like parts 171a of the pixel electrode 171 is three; on the other hand, the total number of the comb-tooth like parts 172a of the common electrode 172 in each pixel region is two. The common electrode 172 further comprises openings or windows 172b formed respectively at the positions overlapped with the channel regions of the TFTs 145. For this reason, the whole channel region of the TFT 145 is exposed from the opening 172b in such a way as not to overlap with the common electrode 172. This is to avoid the change of the characteristics of the TFT 145 caused by the back gate effect.

The base of the pixel electrode 171, which is located on the side of the source electrode 142, is connected mechanically and electrically to the source electrode 142 of the TFT 145. Moreover, the ends of the three comb-tooth like parts 171a of the pixel electrode 171, which are located on the opposite side to the source electrode 142 in the pixel region, are connected mechanically and electrically to the storage capacitor electrode 173. The common electrode 172, which is commonly used for all the pixel regions, is connected electrically to the underlying common bus lines 152 by way of the corresponding contact holes 162 penetrating through the gate insulating film and the protective insulating film in the respective pixel regions.

The storage capacitor electrode 173 is placed at a position overlapped with the common bus line 152 that is directly under the electrode 173 in each pixel region, where the gate insulating film intervenes between the storage capacitor electrode 173 and the common bus line 152. The storage capacitor is formed by the overlapped parts of the storage capacitor electrode 173 and the corresponding common bus line 152. In other words, the storage capacitor is constituted by the storage capacitor electrode 173, the corresponding common line 152, and the gate insulting film intervening between them. As shown in FIG. 3, the storage capacitor is not overlapped with the gate bus line 155 that is adjacent to the corresponding common bus line 152.

As clearly seen from FIGS. 2B, 2C and 3, the common electrode 172 covers the entirety of the drain bus lines 156 extending along the vertical direction of the same figures and the entirety of the gate bus lines 155 extending along the lateral direction of the same figures (except for the openings 172b). Moreover, the common electrode 172 is formed to cover not only the areas directly above the gate bus lines 155 but also the gaps between the gate bus lines 155 and the common bus lines 152 adjacent thereto (each of the adjacent common bus lines 152 is located in the subsequent pixel regions that are downwardly adjacent thereto along the extension direction of the drain bus lines 156, i.e., the vertical direction), the gaps between the gate bus lines 155 and the corresponding source electrodes 142, the gaps between the gate bus lines 155 and the adjacent storage capacitor electrodes 173, and the peripheral areas of the edges of the source electrodes 142 and the adjacent storage capacitor electrodes 173. For this reason, the electric field generated near the gate bus lines 155 can be shielded by the common electrode 172. As seen from FIG. 3, the edges 172c of the common electrode 172 located on the side of the storage capacitor electrodes 173 (which are respectively extended along the adjacent gate bus lines 155) are not overlapped with the gate bus lines 155.

The reference numeral 181 shown in FIG. 3 denotes the black matrix layer formed on the opposite substrate. The black matrix layer 181 comprises rectangular light-shielding regions provided for the respective pixel regions. Each of the light-shielding regions is defined by a rectangular broken line in FIG. 3. Each of the light—shielding regions has a size that covers the whole TFT 145 and is isolated to have a rectangular island-like shape. In this way, the occupation area of each light-shielding region of the black matrix layer 181 is restricted to a minimum necessary for preventing the entry of light into the TFT 145. The prevention of the entry of light into (the channel region of) the TFT 145 by the light-shielding region is to prevent the functions of the TFT 145 from being hindered due to the incident light.

With the active matrix substrate of the related-art LCD device shown in FIGS. 1 to 3, as explained above, the electric field generated in the vicinities of the gate bus lines 155 can be shielded by the common electrode 172 placed in an upper layer than the gate bus lines 155. Therefore, the alignment direction of the liquid crystal molecules existing in the peripheral areas of the gate bus lines 155 is not changed from their initial alignment direction, which means that optical leakage does not occur in the same peripheral areas. Accordingly, it is unnecessary to shield the light in the same peripheral areas on the opposite substrate, and the size of each light-shielding region can be restricted to a minimum, as shown in FIG. 3.

On the other hand, with the active matrix substrate of the related-art LCD device shown in FIGS. 1 to 3, the pixel electrodes 171 may be made of the same transparent conductive metal as the common electrode 172. The structure of the active matrix substrate in this case will be explained below with reference to FIGS. 4 to 10.

FIG. 4 is a plan view showing the structure of the active-matrix substrate of the LCD device having the structure that the pixel electrodes 171 are made of the same transparent conductive metal as the common electrode 172. FIGS. 5A, 5B and 5C are plan views showing the structures of the three layers that constitute the said active-matrix substrates respectively. FIG. 6 is an enlarged partial plan view showing the detailed structure of the vicinity of the gate bus line of the said active-matrix substrate. FIG. 7 is a partial cross-sectional view of the said LCD device along the line VII-VII in FIG. 6. FIGS. 8A and 8B are partial cross-sectional views of the said LCD device along the lines VIIIA-VIIIA and VIIIB-VIIIB in FIG. 6, respectively. FIG. 9 is a plan view obtained by omitting the pixel electrode 171 and the common electrode 172 in FIG. 4 for facilitating the understanding of the understructures of them. FIG. 10 is an enlarged partial plan view obtained by omitting the pixel electrode 171, the common electrode 172, the black matrix layer 181, and the contact holes 161 and 162 in FIG. 6 for facilitating the understanding of the understructures of them. These figures also show the structure of one pixel.

As seen from FIGS. 5A, 5B and 5C, the structure of FIGS. 4 to 10 has the following differences from that of FIGS. 1 to 3: (a) The pixel electrodes 171 are made of the same transparent conductive metal as the common electrode 172 and are placed in the same layer as the common electrode 172.

(b) Auxiliary pixel electrodes 170 are formed on the same layer as the drain bus lines 156.

(c) The pixel electrodes 171 are connected electrically to the corresponding storage capacitor electrodes 173 placed in the lower layer than the pixel electrodes 171 by way of the corresponding contact holes 161 penetrating through the protective insulating film 159 (see FIG. 7 and FIGS. 8A and 8B), and furthermore, the pixel electrodes 171 are connected electrically to the corresponding source electrodes 142 by way of the corresponding auxiliary pixel electrodes 170.

The active-matrix substrate structure shown in FIGS. 4 to 10 is the same as that of FIGS. 1 to 3 except for the above-described differences (a) to (c). Therefore, explanation about the same structural elements as those of the active-matrix substrate structure of the related-art LCD device explained with reference to FIGS. 1 to 3 is omitted here by attaching the same reference numerals as used in FIGS. 1 to 3 to the same structural elements.

The pixel electrode 171 and the common electrode 172 are respectively formed to have such patterns or shapes as shown in FIG. 5C. Each pixel electrode 171 and the common electrode 172 comprise respectively comb-tooth like parts (i.e., thin belt-shaped parts protruding into the pixel region) 171a and 172a that are mated with each other in the state shown in the same figure. Here, the total number of the comb-tooth like parts 171a of the pixel electrode 171 is three; on the other hand, the total number of the comb-tooth like parts 172a of the common electrode 172 in each pixel region is two.

The auxiliary pixel electrodes 170 are formed in the same layer as the drain bus lines 156. The shape of each auxiliary pixel electrode 170 corresponds to the shape formed by the combination of the base of the pixel electrode 171 in the structure shown in FIGS. 1 to 3 and the central comb-tooth like part 171a thereof. The bottom end of the auxiliary pixel electrodes 170 is connected mechanically and electrically to the source electrode 142 and the top end thereof is connected mechanically and electrically to the storage capacitor electrode 173. In this way, the pixel electrode 171 is electrically connected to the source electrode 142 by way of the storage capacitor electrode 173 and the auxiliary pixel electrode 170 in the pixel region.

As shown in FIGS. 9 and 10, the storage capacitor electrode 173 is overlapped with the corresponding common bus line 152 located right below the said storage capacitor electrode 173; however, the storage capacitor electrode 173 is not overlapped with the adjacent gate bus line 155. The common electrode 172 covers the entirety of the corresponding gate bus line 155 and therefore, the edge 172c of the common electrode 172 (which is extended along the adjacent gate bus line 155) located on the side of the storage capacitor electrode 173 is not overlapped with the adjacent gate bus line 155. This point is the same as the structure of FIGS. 1 to 3.

Next, the entire configuration of the related-art LCD device shown in FIGS. 4 to 10 will be explained below with reference to FIG. 7 and FIGS. 8A and 8B.

This LCD device is configured by coupling and uniting the active-matrix substrate and the opposite substrate with each other in such a way that a liquid crystal layer 120 intervenes between these two substrates.

The active-matrix substrate comprises a transparent glass plate 111; and the common bus lines 152, the gate bus lines 155, the drain bus lines 156, the TFTs 145, the auxiliary pixel electrodes 170, the pixel electrodes 171, the common electrode 172, and the storage capacitor electrodes 173 formed on or over the inner surface of the glass plate 111. The common bus lines 152 and the gate bus lines 155, which are placed directly on the inner surface of the glass plate 111, are covered with the gate insulating film 157 except for the positions corresponding to the contact holes 162. The drain electrodes 144, the source electrodes 142, and the semiconductor films 143 of the TFTs 145; the auxiliary pixel electrodes 170; the storage capacitor electrodes 173; and the drain bus lines 156 are placed on the gate insulating film 157. Therefore, the common bus lines 152 and the gate bus lines 155 are electrically insulated from the drain electrodes 144, the source electrodes 142, and the semiconductor films 143, the auxiliary pixel electrodes 170, the storage capacitor electrodes 173, and the drain bus lines 156 by the gate insulating film 157. These structures formed on the glass plate 111 are covered with the protective insulating film 159 except for the positions corresponding to the contact holes 161 and 162.

The pixel electrodes 171 and the common electrode 172 are placed on the protective insulating film 159. As explained above, the pixel electrode 171 is electrically connected to the corresponding storage capacitor electrode 173 located right under the same pixel electrode 171 by way of the corresponding contact hole 161 (which penetrates through the protective insulating film 159) and to the corresponding source electrode 142 by way of the corresponding auxiliary pixel electrode 170 in the pixel region. The common electrode 172 is electrically connected to the common bus lines 152 located right under the common electrode 172 by way of the corresponding contact holes 162 (which penetrates through the protective insulating film 159 and the gate insulating film 157) in the respective pixel regions. The pixel electrodes 171 and the common electrode 172 are respectively formed by patterning transparent conductive metal films, for example, ITO films.

The surface of the active-matrix substrate having the above-described structure (i.e., the surface on which the pixel electrodes 171 and the common electrode 172 are formed) is covered with an alignment film 131 made of an organic polymer. The surface of the alignment film 131 has been subjected to a predetermined aligning treatment for aligning the initial alignment direction of the liquid crystal molecules existing in the liquid crystal layer 120 to a desired direction.

On the other hand, the opposite substrate (which may be termed the color filter substrate) comprises a transparent glass plate 112; a color filter (not shown) formed by three color layers 182R, 182G, and 182B of the three primary colors, i.e., red (R), green (G) and blue (B), formed on the inner surface of the glass plate 112 corresponding to the arrangement of the respective pixel regions; and the black matrix layer 181 for optical shielding. Similar to the structure of FIGS. 1 to 3, the black matrix layer 181 comprises the rectangular light-shielding regions for the respective pixel regions, each of which is defined by the broken line in FIG. 6. In addition, the three color layers 182R, 182G, and 182B are generically termed the color layer 182.

The color layer (i.e., the color filter) 182 and the black matrix layer 181 are covered with an overcoat layer 185 made of an acrylic resin. Columnar spacers (not shown) are formed on the inner surface of the overcoat layer 185 to keep the gap between the active-matrix substrate and the opposite substrate. The inner surface of the overcoat layer 185 is covered with an alignment film 132 made of an organic polymer. The surface of the alignment film 132 has been subjected to a predetermined aligning treatment for aligning the initial alignment direction of the liquid crystal molecules existing in the liquid crystal layer 120 to a desired direction.

The active-matrix substrate and the opposite substrate each having the above-described structure are superposed on each other at a predetermined gap in such a way that their surfaces on which the alignment films 131 and 132 are respectively formed are directed inwardly and opposed to each other. The liquid crystal layer 120 is formed in the gap between the active-matrix and opposite substrates. To confine the liquid crystal material existing in the liquid crystal layer 120 into the gap between the two substrates, the outer edges of the two substrates are sealed with a sealing material (not shown). A pair of polarizer plates (not shown) is arranged on the outer surfaces of the two substrates, respectively.

In addition, the Patent Document 3 (Japanese Unexamined Patent Publication No. 2000-029014) published on Jan. 21, 2000 and the Patent Document 4 (Japanese Unexamined Patent Publication No. 2002-082630) published on Mar. 22, 2002 disclose the technique for forming the light-shielding regions of the black matrix layer 181 by overlapping the end portions of the adjoining color layers of the color filter, where the black matrix layer 181 is not used. If this technique is employed, the formation processes of the black matrix layer 181 can be omitted and as a result, the fabrication cost lowering is realizable.

With the above-described two structures of the related-art LCD devices, the whole surfaces of the respective gate bus lines 155 are covered with the common electrode 172 placed in the upper layer than the gate bus lines 155. This is to prevent the optical leakage caused by the alignment direction change of the liquid crystal molecules from their initial alignment direction in the peripheral areas of the gate bus lines 155 and the TFTs 145 due to the electric field generated in the same peripheral areas. However, in the case where the whole surfaces of the respective gate bus lines 155 are covered with the common electrode 172 in this way, there is a problem that the degree of freedom in designing the pattern and layout of the respective constituent elements of these two related-art LCD devices is low and as a result, it is difficult to improve the aperture ratio.

As another method of preventing such the optical leakage as explained above, a method of broadening the respective light-shielding regions of the black matrix layer 181 that are arranged on the opposite substrate at the predetermined positions overlapped with the respective gate bus lines 155 is known. In this method, however, it is necessary to broaden the respective light-shielding regions sufficiently in consideration of the margins for the positional deviation occurring in the coupling operation of the active matrix substrate and the opposite (or color filter) substrate. Accordingly, in this case also, it is difficult to realize a high aperture ratio.

In the case where the light-shielding regions are formed by overlapping the end portions of the different color layers of the color filter instead of the use of the black matrix layer 181, as disclosed in the Patent Documents 3 and 4, fabrication cost lowering may be realized due to the omission of the formation processes of the black matrix layer 181. In this case also, however, it is necessary to form the sufficiently wide light-shielding regions on the opposite substrate in consideration of the margins for the positional deviation between the active-matrix substrate and the opposite substrate. Therefore, it is difficult to realize a high aperture ratio.

Furthermore, there is another problem that the large level difference formed by overlapping the end portions of the different color layers affects badly the alignment of the liquid crystal molecules and/or prolong the time required for the injection process of the liquid crystal material.

SUMMARY OF THE INVENTION

The present invention was created in consideration of the above-described problems or disadvantages.

An object of the present invention is to provide a lateral electric field type LCD device that makes it possible to increase the degree of freedom in designing the constituent elements thereof and to improve the aperture ratio easily compared with the related-art LCD structure shown in FIGS. 4 to 10.

Another object of the present invention is to provide a lateral electric field type LCD device that makes it possible to increase the luminance or to reduce the electric power consumption compared with the related-art LCD structure shown in FIGS. 4 to 10.

The above objects together with others not specifically mentioned will become clear to those skilled in the art from the following description.

A lateral electric field type liquid crystal display device according to the present invention comprises:

a first substrate and a second substrate placed opposite to each other at an approximately constant gap;

a liquid crystal layer formed between the first substrate and the second substrate;

drain bus lines formed on the first substrate;

gate bus lines formed on the first substrate in such a way as to be intersected with the drain bus lines;

pixel regions defined in a matrix array by the drain bus lines and the gate bus lines;

at least one first liquid crystal driving electrode and second liquid crystal driving electrodes formed on the first substrate;

thin-film transistors formed on the first substrate for the respective pixel regions; and storage capacitor electrodes formed on the first substrate for the respective pixel regions;

wherein an alignment direction of liquid crystal molecules existing in the liquid crystal layer is rotated in planes approximately parallel to the first substrate and the second substrate by applying liquid crystal driving electric field to the liquid crystal layer using the at least one first liquid crystal driving electrode and the second liquid crystal driving electrodes, thereby displaying images;

the drain bus lines are entirely covered with the at least one first liquid crystal driving electrode;

the gate bus line corresponding to each of the pixel regions is covered with the at least one first liquid crystal driving electrode except for a predetermined non-overlapped area existing in a part that does not overlap with the corresponding thin-film transistor; and the predetermined non-overlapped area of the gate bus line corresponding to each of the pixel regions is covered with the storage capacitor electrode corresponding to the adjacent pixel region.

With the lateral electric field type liquid crystal display device according to the present invention, the drain bus lines are entirely covered with the at least one first liquid crystal driving electrode (which corresponds to, for example, a common electrode), and at the same time, the gate bus line corresponding to each of the pixel regions is covered with the at least one first liquid crystal driving electrode except for the predetermined non-overlapped area existing in the part that does not overlap with the corresponding thin-film transistor. Moreover, the predetermined non-overlapped area of the gate bus line corresponding to each of the pixel regions (i.e., the area of the gate bus line that is not covered with the at least one first liquid crystal driving electrode in the part that does not overlap with the corresponding thin-film transistor) is covered with the storage capacitor electrode corresponding to the adjacent pixel region to the said gate bus line. Therefore, similar to the structure of the related-art LCD device shown in FIGS. 4 to 10, the electric field generated in the vicinities of the respective gate bus lines can be shielded effectively by the at least one first liquid crystal driving electrode.

As a result, it is unnecessary that the shape or pattern of the at least one first liquid crystal driving electrode is restricted to a shape or pattern that covers the whole surface of the gate bus line corresponding to each pixel region (except for the part that overlaps with the corresponding thin-film transistor) as used in the above-described structure of the related-art LCD device shown in FIGS. 4 to 10. This means that the at least one first liquid crystal driving electrode may have a shape or pattern that includes a part that does not cover the gate bus line corresponding to each pixel region.

Accordingly, the restriction that the gate bus line corresponding to each of the pixel regions is entirely covered with the at least one first liquid crystal driving electrode in the part that does not overlap with the corresponding thin-film transistor, which is included in the above-described structure of the related-art LCD device shown in FIGS. 4 to 10, is eliminated. In this way, the degree of freedom in designing the constituent elements of a LCD device of this type can be increased.

Moreover, because of the elimination of the above-described restriction, the positions of the contact holes and those of the ends of the second liquid crystal driving electrodes (which correspond to, for example, pixel electrodes) can be shifted in due order toward the outer edges of the pixel regions. Therefore, the aperture ratio can be improved (in other words, a higher aperture ratio can be realized) easily compared with the above-described related-art LCD structure shown in FIGS. 4 to 10.

Due to the improvement of the aperture ratio, if the amount of emitted light from the backlight unit is not changed, the luminance can be increased compared with the related-art LCD structure shown in FIGS. 4 to 10. Due to the same reason, if the luminance is not changed, the electric power consumption can be reduced compared with the related-art LCD structure shown in FIGS. 4 to 10.

In addition, by properly adjusting the shape and/or the position of the storage capacitor electrode, a desired storage capacitance can be ensured easily without lowering the aperture ratio or while improving the aperture ratio.

In a preferred embodiment of the LCD device according to the present invention, the gate bus line corresponding to each of the pixel regions is placed in a lower layer than the corresponding storage capacitor electrode, and the at least one first liquid crystal driving electrode is placed in an upper layer than the corresponding storage capacitor electrode. Moreover, in a vicinity of each of the non-overlapped areas, the storage capacitor electrode is overlapped with the adjacent gate bus line in such a way as to exceed across a first side edge of the same gate bus line, and the at least one first liquid crystal driving electrode is overlapped with the same gate bus line in such a way as to exceed across a second side edge thereof opposite to the first side edge.

In this embodiment, it is preferred that the at least one first liquid crystal driving electrode is partially overlapped with the corresponding storage capacitor electrode in each of the non-overlapped areas. In addition, it is preferred that the at least one first liquid crystal driving electrode does not exceed across the first side edge of the gate bus line in each of the non-overlapped areas.

In another preferred embodiment of the LCD device according to the present invention, the at least one first liquid crystal driving electrode comprises openings formed in such a way as to expose channel regions of the TFTs, respectively.

In this embodiment, it is preferred that opposite edges formed by each of the openings of the at least one first liquid crystal driving electrode have a smaller width than the corresponding gate bus line.

In still another preferred embodiment of the LCD device according to the present invention, light-shielding regions are formed on the second substrate at positions opposite to channel regions of the TFTs. Each of the light-shielding regions has an isolated pattern. The light-shielding regions are formed corresponding to the respective pixel regions.

In this embodiment, it is preferred that the light-shielding regions are formed by overlapping at least two of color layers that constitute a color filter. In addition, it is preferred that the light-shielding regions have an optical density (OD) value that is equal to 1.5 or greater and that is equal to 3.0 or less.

BRIEF DESCRIPTION OF THE DRAWINGS

In order that the present invention may be readily carried into effect, it will now be described with reference to the accompanying drawings.

FIGS. 5A, 5B and 5C are plan views showing the structures of the three layers that constitute the active-matrix substrate of the related-art lateral electric field type LCD device of FIG. 4, respectively.

FIGS. 8A and 8B are partial cross-sectional views of the related-art lateral electric field type LCD device of FIG. 4 along the lines VIIIA-VIIIA and VIIIB-VIIIB in FIG. 6, respectively.

FIGS. 15A and 15B are partial cross-sectional views of the lateral electric field type LCD device according to the first embodiment of FIG. 10 along the lines XVA-XVA and XVB-XVB in FIG. 13, respectively.

DETAILED DESCRIPTION OF THE PREFERRED EMBODIMENTS

Figure 1:
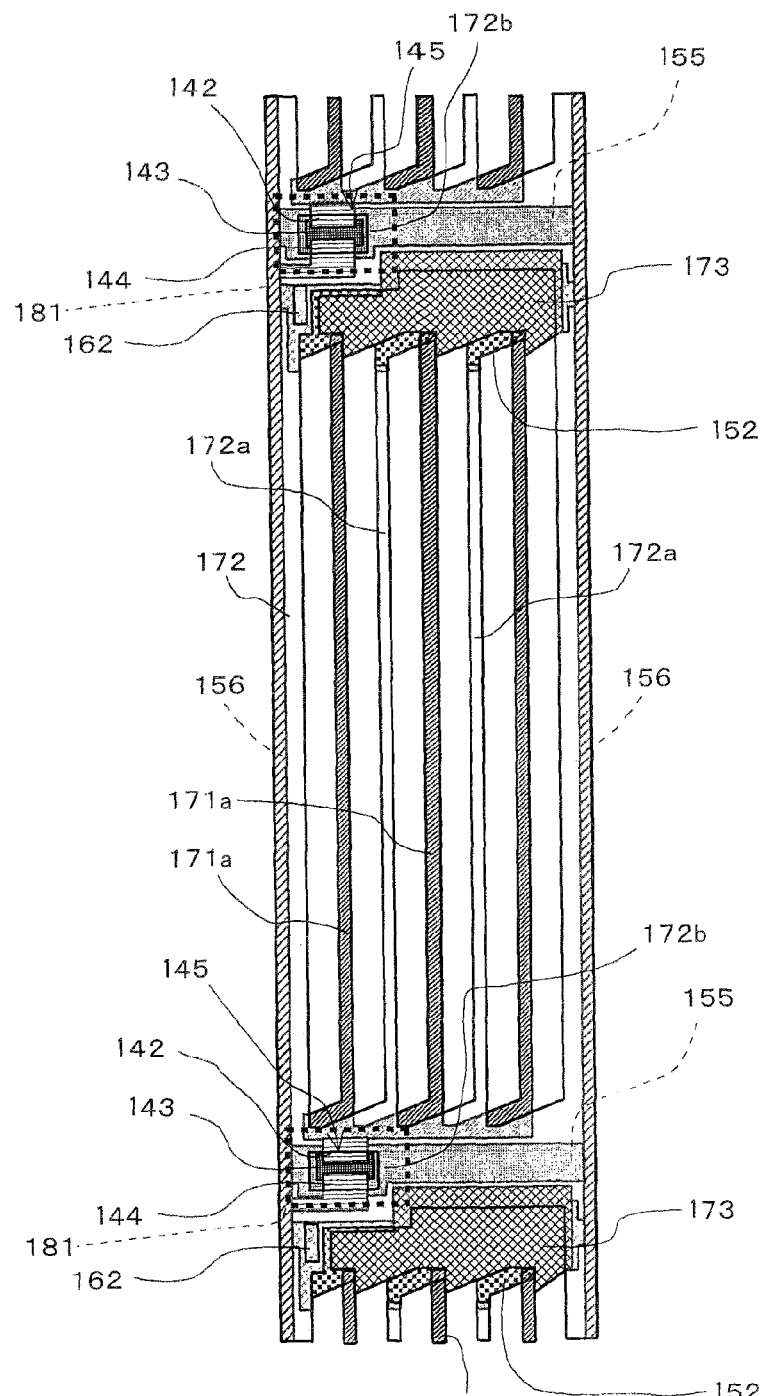
FIG. 1 is a plan view showing the structure of the active-matrix substrate of a related-art lateral electric field type LCD device.

Preferred embodiments of the present invention will be described in detail below while referring to the drawings attached.

First Embodiment

FIGS. 11 to 17 show the structure of the active-matrix substrate of a lateral electric field type LCD device according to a first embodiment of the present invention. Since all the pixels of the active-matrix addressing LCD device have the same structure, the structure of one pixel is shown in these figures.

Figure 16:
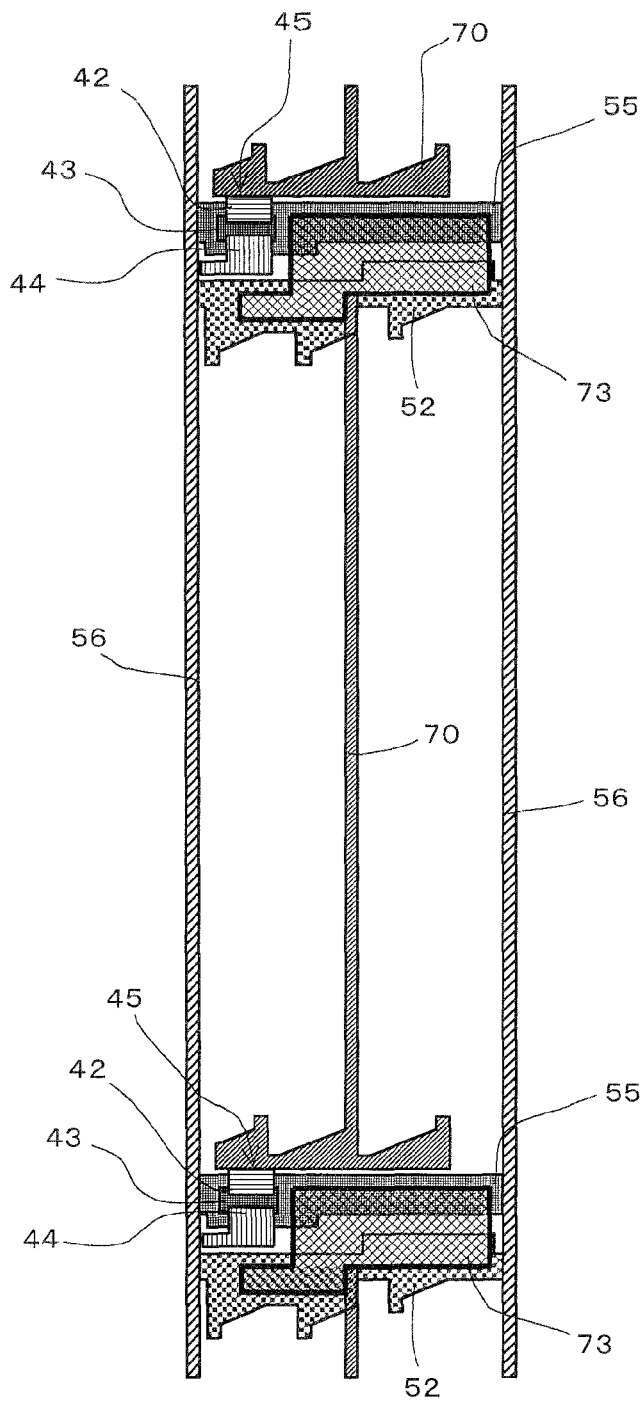
FIG. 16 is a plan view obtained by omitting the pixel electrode 71 and the common electrode 72 in FIG. 11 for facilitating the understanding of the understructures thereof.
Figure 17:
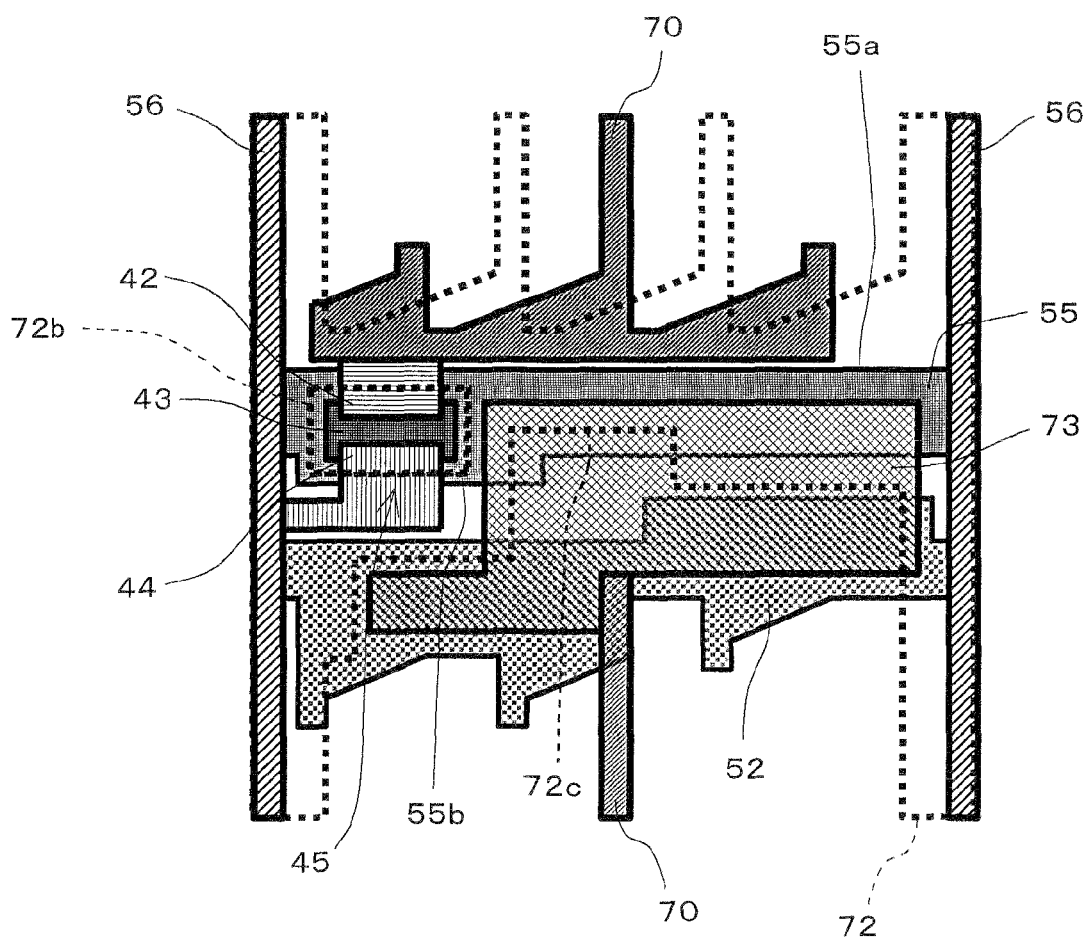
FIG. 17 is an enlarged partial plan view obtained by omitting the pixel electrode 71, the common electrode 72, the black matrix layer 81, and the contact holes 61 and 62 in FIG. 13 for facilitating the understanding of the understructures thereof.

In FIGS. 16 and 17, storage capacitor electrodes 73 are illustrated as a translucent element for facilitating the understanding of the relationships among common bus lines 52, gate bus lines 55, storage capacitor electrodes 73, and a common electrode 72.

Figure 14:
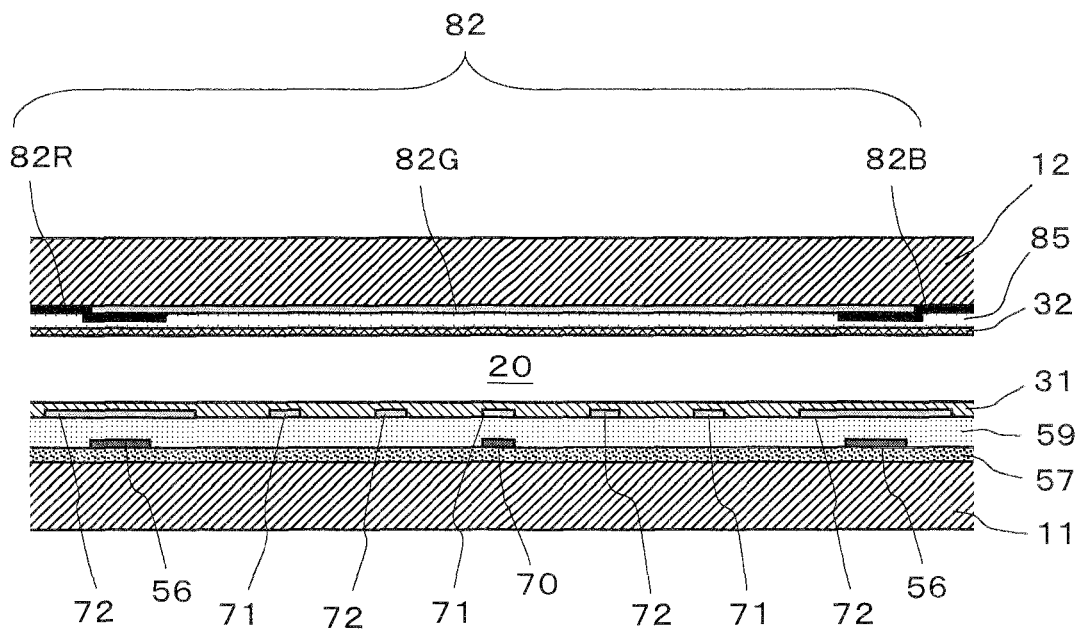
FIG. 14 is a partial cross-sectional view of the lateral electric field type LCD device according to the first embodiment of FIG. 10 along the line XIV-XIV in FIG. 13.

As seen from FIG. 14 and FIGS. 15A and 15B showing the entire configuration of the device, the LCD device according to the first embodiment of the invention is configured by coupling and uniting an active-matrix substrate and an opposite substrate with each other in such a way that a liquid crystal layer 20 intervenes between the active-matrix substrate and the opposite substrate.

As shown in FIGS. 12A, 12B, 12C, 14, 15A and 15B, the active-matrix substrate of this LCD device comprises a transparent glass plate 11; and common bus lines 52, gate bus lines 55, drain bus lines 56, TFTs 45, auxiliary pixel electrodes 70, pixel electrodes 71, a common electrode 72, and storage capacitor electrodes 73 formed on or over the inner surface of the glass plate 11. The common bus lines 52 and the gate bus lines 55, which are placed directly on the inner surface of the glass plate 11, are covered with a gate insulating film 57 except for the positions corresponding to contact holes 62. The drain electrodes 44, the source electrodes 42, and the semiconductor films 43 of the TFTs 45; the auxiliary pixel electrodes 70; the storage capacitor electrodes 73; and the drain bus lines 56 are placed on the gate insulating film 57. Therefore, the common bus lines 52 and the gate bus lines 55 are electrically insulated from the drain electrodes 44, the source electrodes 42, and the semiconductor films 43, the auxiliary pixel electrodes 70, the storage capacitor electrodes 73, and the drain bus lines 56 by the gate insulating film 57. These structures formed on the glass plate 11 are covered with a protective insulating film 59 except for the positions corresponding to the contact holes 61 and 62.

The pixel electrodes 71 and the common electrode 72 are placed on the protective insulating film 59. In each of the pixel regions, the pixel electrode 71 is electrically connected to the corresponding storage capacitor electrode 73 located right under the said electrode 71 by way of the corresponding contact hole 61 (which penetrates through the protective insulating film 59). Furthermore, the pixel electrode 71 is electrically connected to the corresponding source electrode 42 by way of the corresponding auxiliary pixel electrode 70 in the pixel region. The common electrode 72 is electrically connected to the common bus lines 52 located right under the said electrode 72 by way of the corresponding contact holes 62 (which penetrates through the protective insulating film 59 and the gate insulating film 57) in the respective pixel regions. The pixel electrodes 71 and the common electrode 72 are respectively formed by patterning transparent conductive metal films, for example, ITO films.

The surface of the active-matrix substrate having the above-described structure (i.e., the surface on which the pixel electrodes 71 and the common electrode 72 are formed) is covered with an alignment film 31 made of an organic polymer. The surface of the alignment film 31 has been subjected to a predetermined aligning treatment for aligning the initial alignment direction of the liquid crystal molecules existing in the liquid crystal layer 20 to a desired direction.

On the other hand, the opposite substrate (which may be termed the color filter substrate) of this LCD device comprises a transparent glass plate 12; a color filter (not shown) formed by three color layers 82R, 82G, and 82B of the three primary colors (i.e., red (R), green (G), and blue (B)), formed on the inner surface of the glass plate 12 corresponding to the arrangement of the respective pixel regions; and the black matrix layer 81 for optical shielding formed on the inner surface of the glass plate 12. In addition, the three color layers 82R, 82G, and 82B are generically termed the color layer 82.

The color layer (i.e., the color filter) 82 and the black matrix layer 81 are covered with an overcoat layer 85 made of an acrylic resin. Columnar spacers (not shown) are formed on the inner surface of the overcoat layer 85 to keep the gap between the active-matrix substrate and the opposite substrate at a constant value. The inner surface of the overcoat layer 85 is covered with an alignment film 32 made of an organic polymer. The surface of the alignment film 32 has been subjected to a predetermined aligning treatment for aligning the initial alignment direction of the liquid crystal molecules existing in the liquid crystal layer 20 to a desired direction.

The active-matrix substrate and the opposite substrate each having the above-described structure are superposed on each other at a predetermined gap in such a way that their surfaces on which the alignment films 31 and 32 are respectively formed are directed inwardly and opposed to each other. The liquid crystal layer 20 is formed in the gap between the active-matrix and opposite substrates. To confine the liquid crystal material existing in the liquid crystal layer 20 into the gap between the two substrates, the outer edges of the two substrates are sealed with a sealing material (not shown). A pair of polarizer plates (not shown) is arranged on the outer surfaces of the two substrates, respectively.

Next, the structure of the above-described active-matrix substrate will be explained in more detail below with reference to FIGS. 11 to 13.

Figure 11:
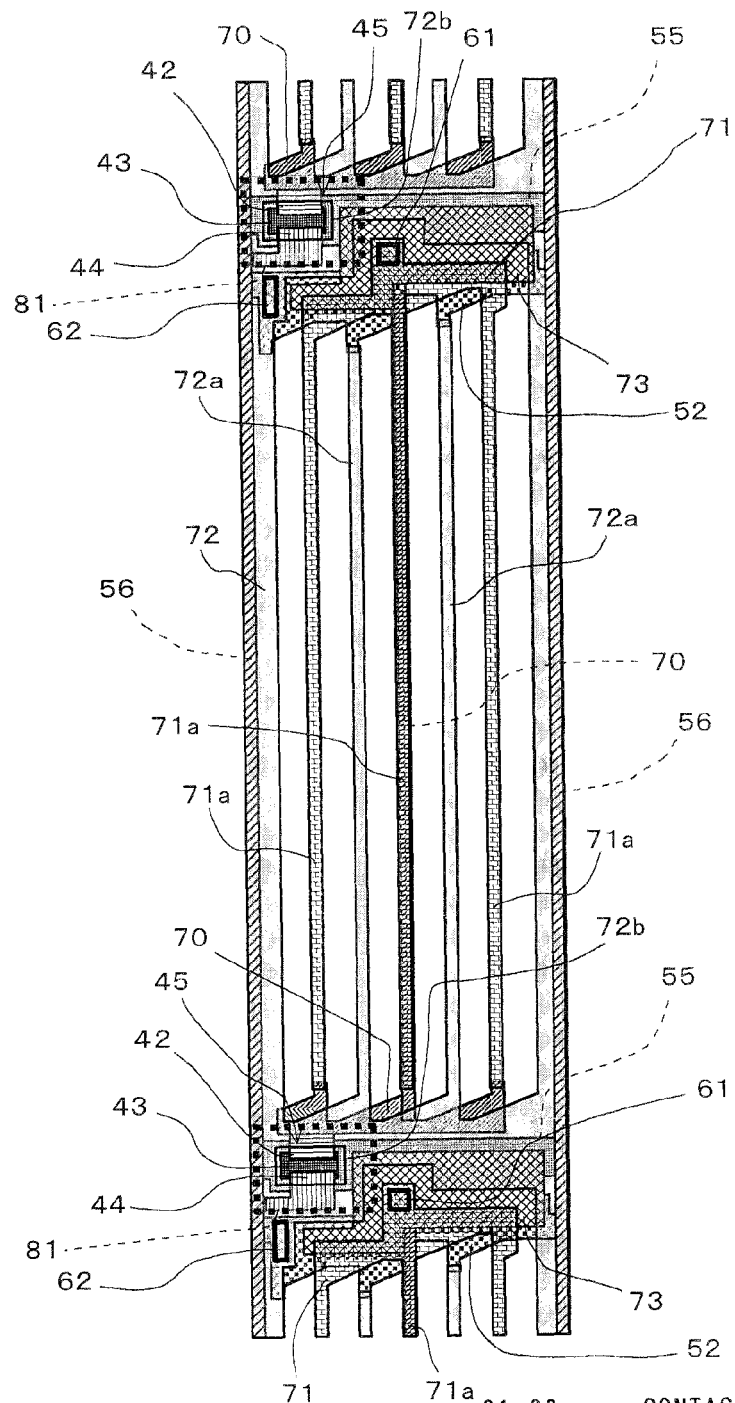
FIG. 11 is a plan view showing the structure of the active-matrix substrate of a lateral electric field type LCD device according to a first embodiment of the present invention.

The gate bus lines 55 extending in parallel to each other at equal intervals along the lateral or horizontal direction of FIG. 11 and the common bus lines 52 extending in parallel to each other at equal intervals along the longitudinal or vertical direction of the same figure define rectangular regions. Each of these rectangular regions forms a pixel region. These pixel regions (i.e., the pixels) are arranged in a matrix array as a whole. Each of the TFTs 45 is located near one of the intersections formed by the two gate bus lines 55 and the two drain bus lines 56 that define the pixel region (i.e., at the lower left intersection in FIG. 11). Similar to the gate bus lines 55, the common bus lines 52 extend along the lateral direction of the same figure in parallel with the gate bus lines 55. Each of the common bus lines 52 is located at the opposite side to the TFT 45 (i.e., at the upper end in FIG. 11) in the pixel region. In other words, it is placed near one of the two gate bus lines 55 that define the pixel region, which is located on the distant side from the TFT 45 in the pixel region, (i.e., the gate bus line 55 located at the upper position in FIG. 11). Therefore, it may be said that each of the common bus lines 52 is located near the TFTs 45 existing in the preceding pixel regions that are upwardly adjacent thereto along the extension direction of the drain bus lines 56 (i.e., the vertical direction) to be apart from the TFTs 45.

The storage capacitor electrode 73 is located at the opposite side to the TFT 45 (i.e., at the upper end in FIG. 11) in the pixel region. In other words, the storage capacitor electrode 73 is placed near one of the two gate bus lines 55 that defines the pixel region, which is located on the distant side from the TFT 45 in the pixel region, (i.e., the gate bus line 55 located at the upper position in FIG. 11). The storage capacitor electrode 73 is formed in such a way as to be overlapped with the corresponding common bus line 52 that is located directly under the said electrode 73 in such a way that the gate insulating film 57 intervenes between them in the pixel region. The storage capacitor is constituted by the storage capacitor electrode 73, the corresponding common line 52, and the gate insulting film 57 intervening between them.

The above-described structure is the same as that of the related-art LCD device shown in FIGS. 4 to 10.

A part (i.e., an upper part in FIG. 11) of the storage capacitor electrode 73 is projected along the inner surface of the glass plate 11 toward the side of the preceding pixel regions that are upwardly adjacent along the extension direction of the drain bus lines 56 (i.e., the upper side in FIG. 11 and FIGS. 12 A to 12C) compared with the related-art LCD device shown in FIGS. 4 to 10. Therefore, as shown in FIGS. 13, 16 and 17, the projected part of the storage capacitor electrode 73 is overlapped with the adjacent gate bus line 55, that is, one of the two gate bus lines 55 that define the pixel region, which is located on the distant side from the TFT 45 in the pixel region, (i.e., the gate bus line 55 located at the upper position in FIG. 11), in such a way that the gate insulating film 57 intervenes between them. In this way, a gate storage structure is formed. In other words, the storage capacitor electrode 73 is overlapped not only with the corresponding common bus line 52 located right below the same electrode 73 to form a storage capacitor (which is the same as the above-described related-art LCD device shown in FIGS. 4 to 10) but also with the adjacent gate bus line 55 to form another storage capacitor (i.e., a gate storage capacitor). Here, the storage capacitor electrode 73 has an approximately rectangular pattern (see FIG. 12B).

As explained later, the projected part of the storage capacitor electrode 73 is formed to cover the predetermined non-overlapped area of the adjacent gate bus line 55 that is not overlapped with the common electrode 72, where the non-overlapped area of the said gate bus line 55 is located in a part that does not overlap with the corresponding TFT 45 (in other words, the removed part of the common electrode 72 near the contact hole 61). Specifically, as shown in FIGS. 13 and 17, the gate bus line 55 adjacent to the storage capacitor electrode 73 comprises the non-overlapped area that is not overlapped with the common electrode 72 (in other words, that is not covered with the common electrode 72) near the contact hole 61, and the non-overlapped area is overlapped with the storage capacitor electrode 73. Therefore, the non-overlapped area of the gate bus line 55, which is not overlapped with the common electrode 72 and the corresponding TFT 45, is covered with the storage capacitor electrode 73. For this reason, the electric field generated in the periphery of each gate bus line 55 can be shielded in the same way as the above-described related-art LCD device where the whole surface of each gate bus line 155 is overlapped with the common electrode 172. This structure makes it possible to shift or displace the position of the contact hole 61 to a position closer to the edge of the pixel region in the designing operation, as shown in FIG. 13, while blocking the electric field generated in the periphery of each gate bus line 55. This means that the aperture ratio can be improved easily.

Figures 2A, 2B, 2C:
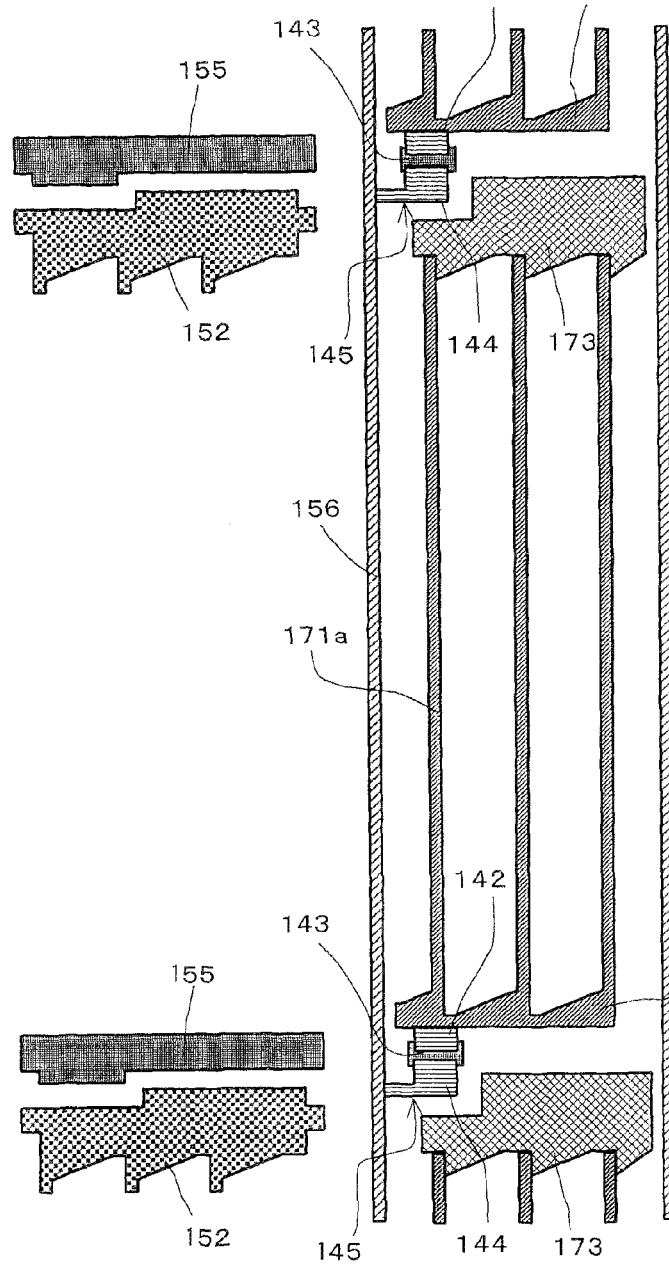
FIGS. 2A, 2B and 2C are plan views showing the structures of the three layers that constitute the active-matrix substrate of the related-art lateral electric field type LCD device of FIG. 1, respectively.
Figure 3:
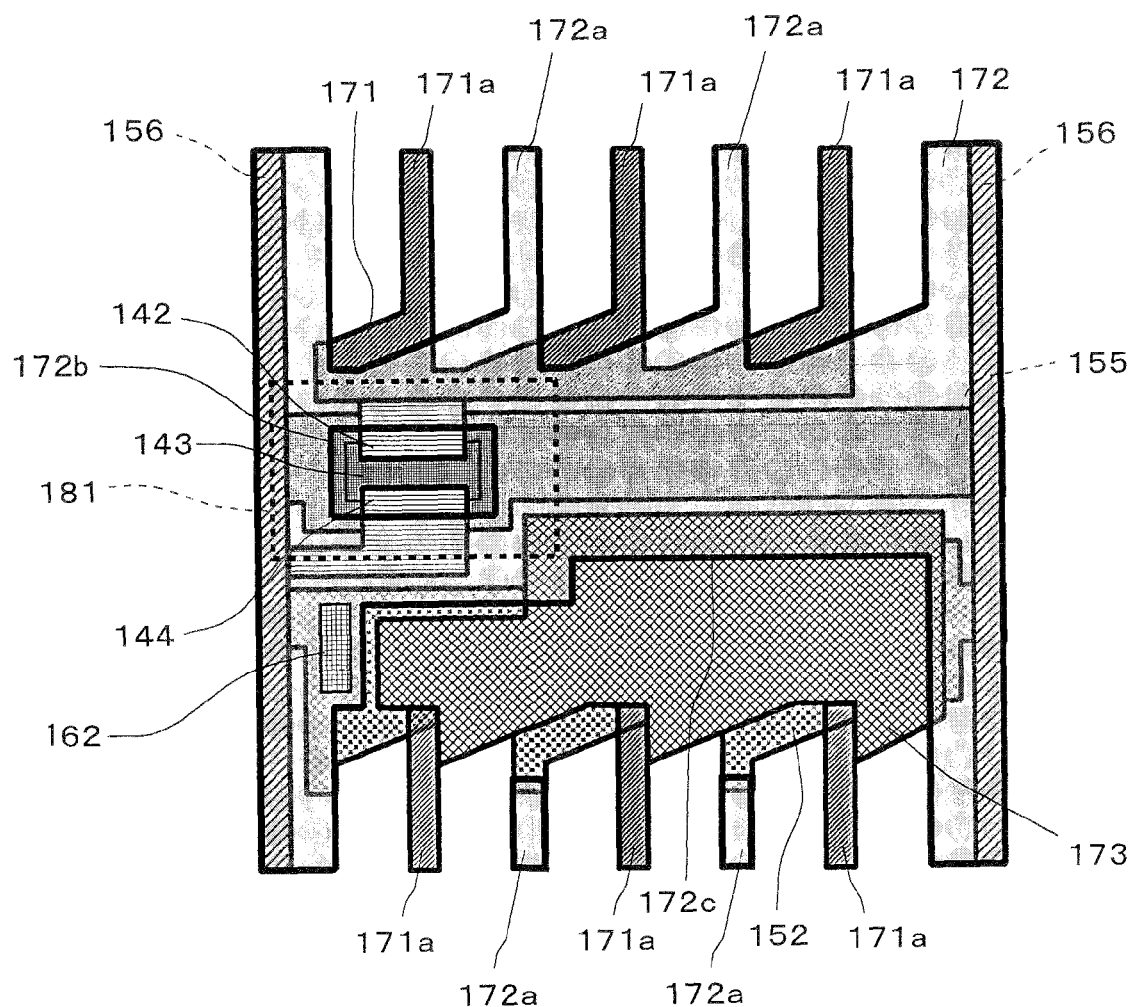
FIG. 3 is an enlarged partial plan view showing the detailed structure of the vicinity of the gate bus line of the related-art lateral electric field type LCD device of FIG. 1.
Figure 4:
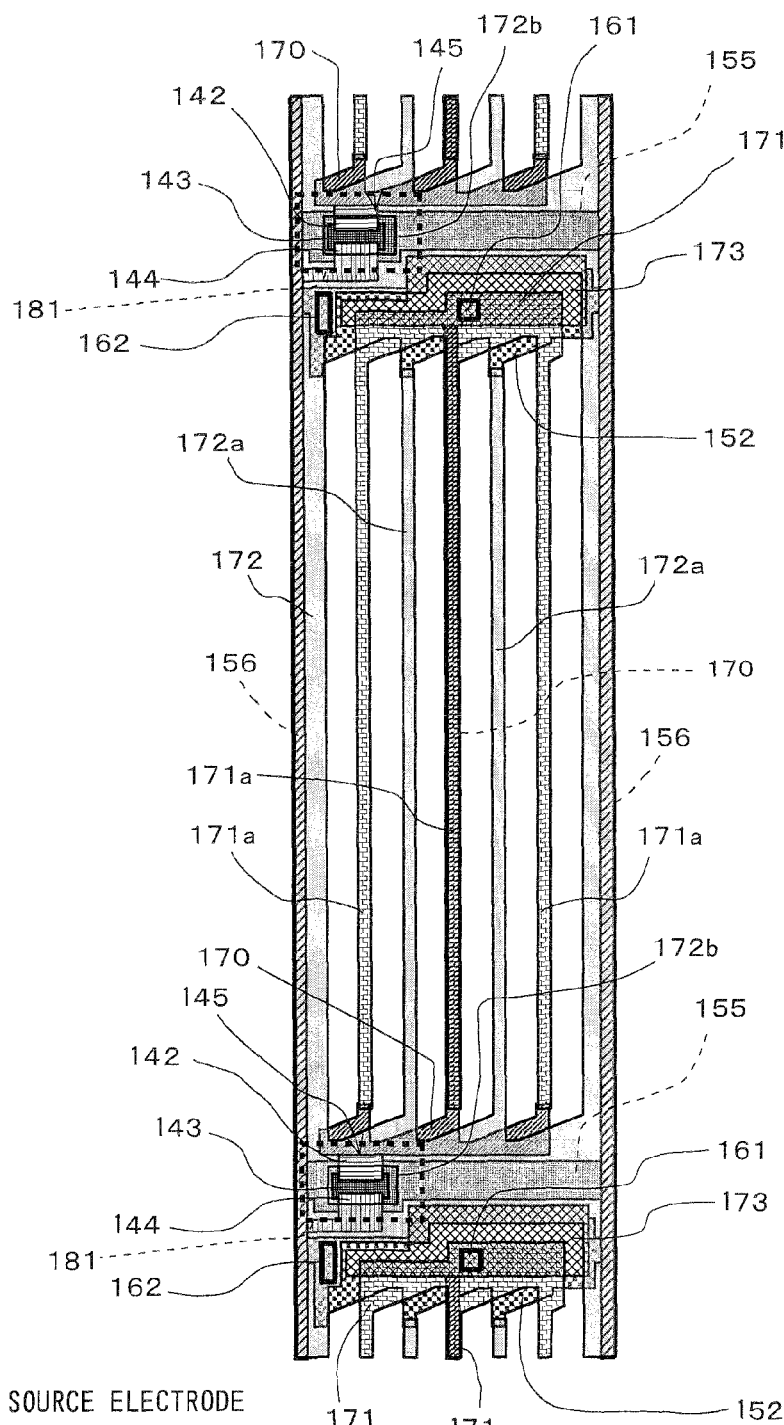
FIG. 4 is a plan view showing the structure of the active-matrix substrate obtained by forming the pixel electrodes 171 by the same transparent conductive metal as the common electrode 172 in the related-art lateral electric field type LCD device of FIG. 1.
Figure 6:
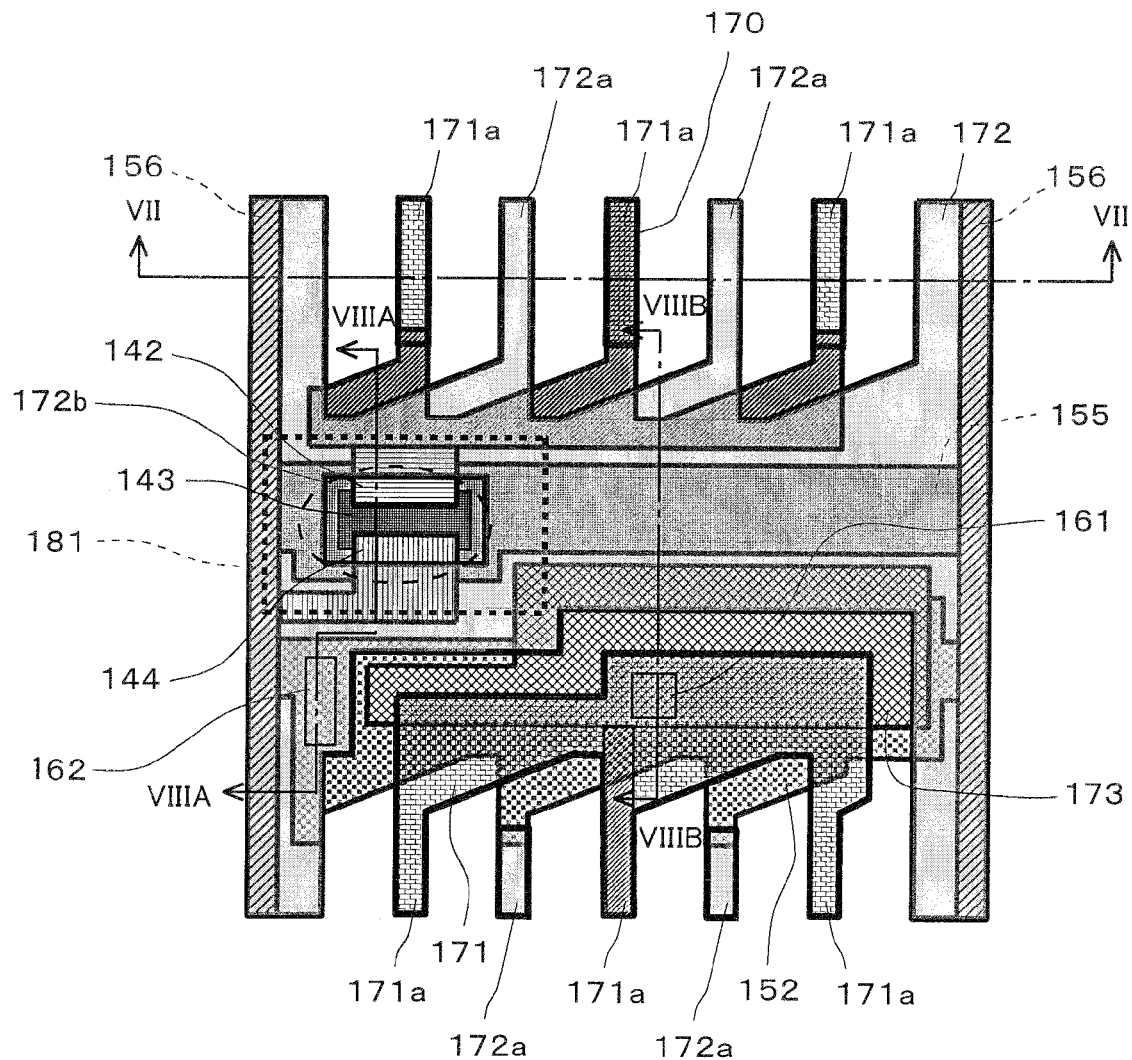
FIG. 6 is an enlarged partial plan view showing the detailed structure of the vicinity of the gate bus line of the related-art lateral electric field type LCD device of FIG. 4.
Figure 7:
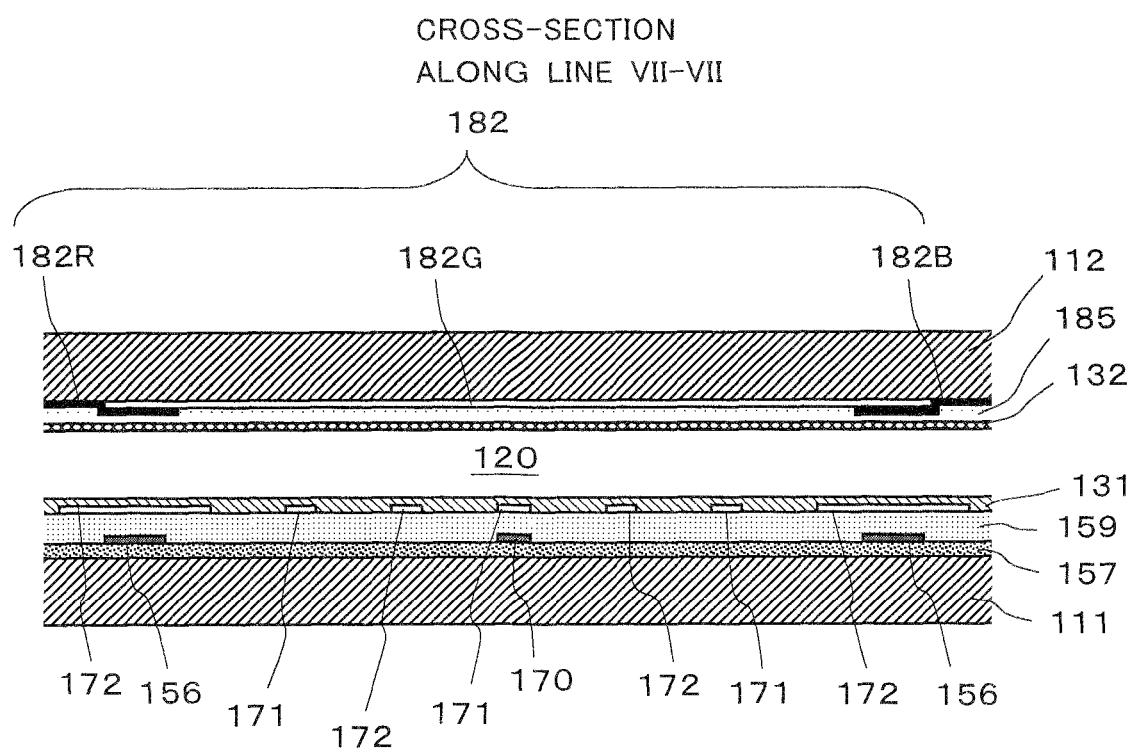
FIG. 7 is a partial cross-sectional view of the related-art lateral electric field type LCD device of FIG. 4 along the line VII-VII in FIG. 6.
Figure 9:
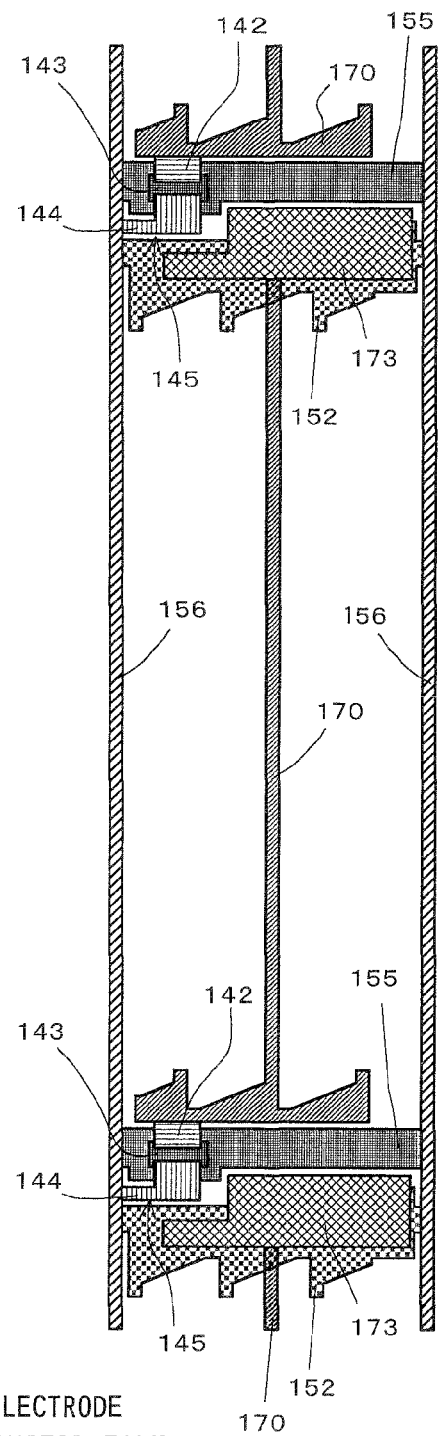
FIG. 9 is a plan view obtained by omitting the pixel electrode 171 and the common electrode 172 in FIG. 4 for facilitating the understanding of the understructures thereof.
Figure 10:
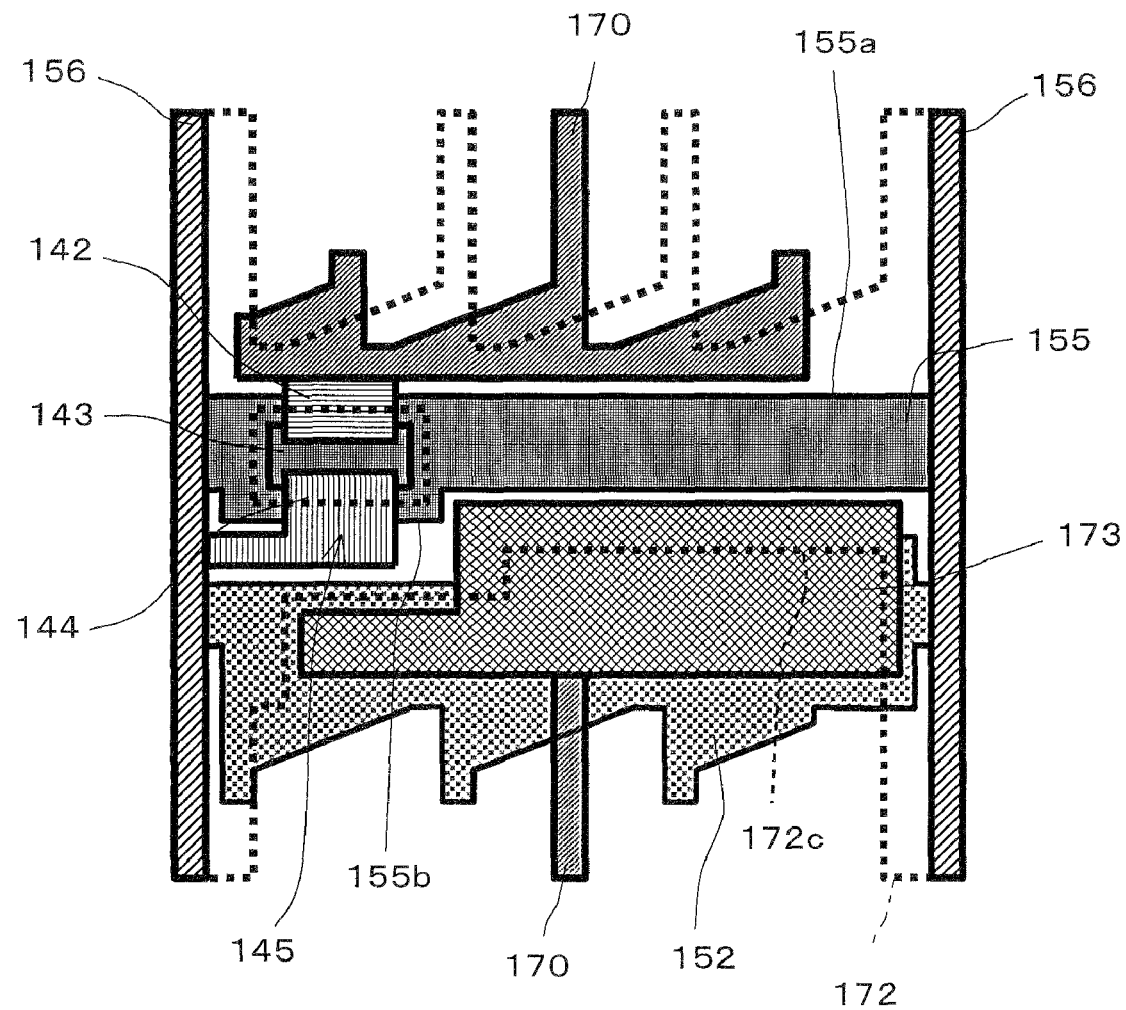
FIG. 10 is an enlarged partial plan view obtained by omitting the pixel electrode 171, the common electrode 172, the black matrix layer 181, and the contact holes 161 and 162 in FIG. 4 for facilitating the understanding of the understructures thereof.

The auxiliary pixel electrodes 70 are formed in the same layer as the drain bus lines 56, in other words, they are formed on the gate insulating film 57. The shape of the auxiliary pixel electrode 70 corresponds to the shape formed by the combination of the base of the pixel electrode 171 in the structure of the related-art LCD device shown in FIGS. 1 to 3 and the central comb-tooth like part 171a thereof. The bottom end of the auxiliary pixel electrodes 70 is connected mechanically and electrically to the source electrode 42 of the TFT 45 and the top end thereof is connected mechanically and electrically to the storage capacitor electrode 73 (see FIG. 12B).

Figure 12A:
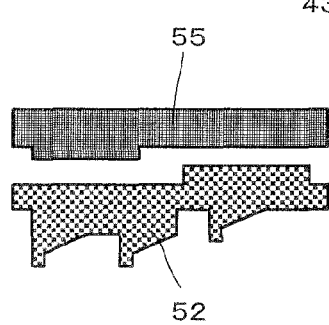
FIGS. 12A, 12B and 12C are plan views showing the structures of the three layers that constitute the active-matrix substrate of the lateral electric field type LCD device according to the first embodiment of FIG. 10, respectively.
Figure 12B:
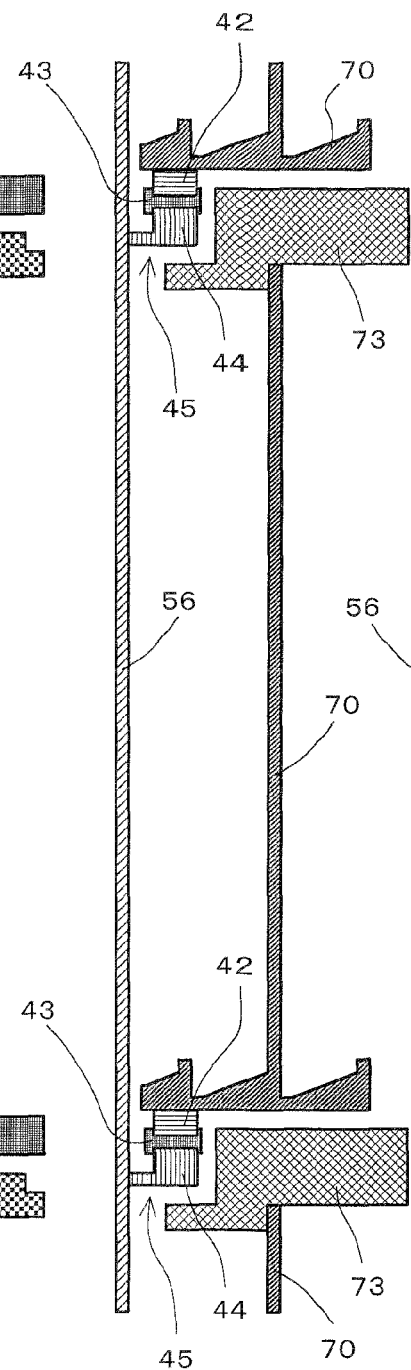

The drain electrode 44, the source electrode 42, and the semiconductor layer film 43 of the TFT 45 are respectively formed on the gate insulating film 57 to have such patterns or shapes as shown in FIG. 12B. The gate electrode (not shown) of the TFT 45 is formed to be united with the gate bus line 55, in other words, the gate electrode is a part of the gate bus line 55. The gate electrode is placed at a position overlapping with the semiconductor film 43 between the drain electrode 44 and the source electrode 42. An amorphous silicon film is used as the semiconductor film 43.

Figure 12C:
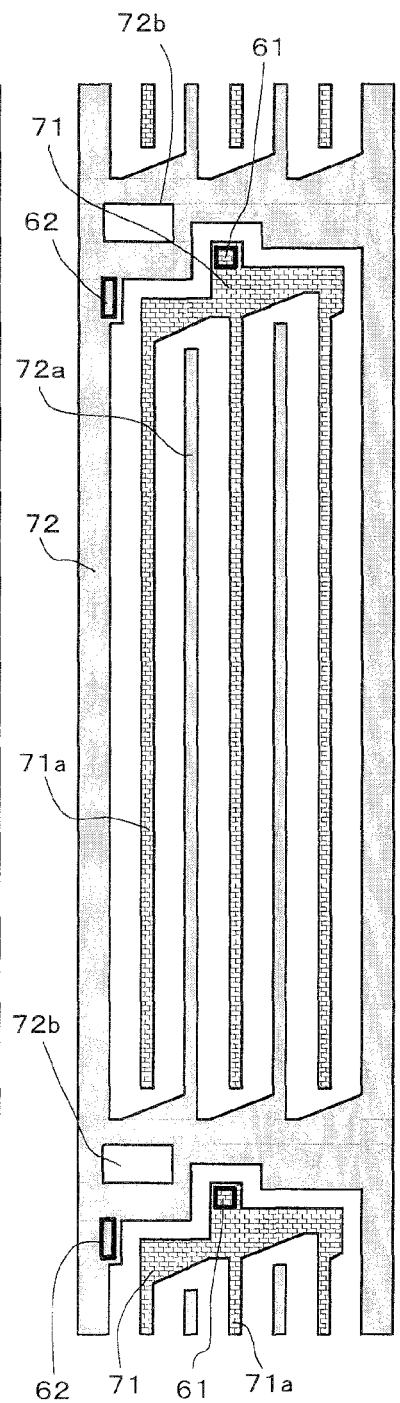

The pixel electrode 71 and the common electrode 72 provided for generating liquid crystal driving electric field are respectively formed to have such patterns or shapes as shown in FIG. 12C. The pixel electrode 71 and the common electrode 72 comprise comb-tooth like parts (i.e., thin belt-shaped parts protruding in the pixel region) 71a and 72a that are mated with each other, respectively. Here, the total number of the comb-tooth like parts 71a of the pixel electrode 71 is three; on the other hand, the total number of the comb-tooth like parts 72a of the common electrode 72 in each pixel region is two.

The pixel electrodes 71 are provided for the pixel regions in a one-to-one correspondence. The common electrode 72 is commonly used for all the pixel regions. Two of the comb-tooth like parts 72a of the common electrode 72 are assigned to each pixel region.

The pixel electrode 71 is electrically connected to the storage capacitor electrode 73 located just below the same pixel electrode 71 by way of the corresponding contact hole 61 penetrating through the protective insulating film 59 at the base of the three comb-tooth like parts 71a (which are located on the opposite side to the source electrode 42). Since the storage capacitor electrode 73 is electrically connected to the source electrode 42 of the TFT 45 by way of the auxiliary pixel electrode 70, the pixel electrode 71 is electrically connected to the source electrode 42 by way of the storage capacitor electrode 73 and the auxiliary pixel electrode 70.

The common electrode 72 is electrically connected to the common bus lines 52 just below the same electrode 72 in the respective pixel regions by way of the corresponding contact holes 62 penetrating through the gate insulating film 57 and the protective insulating film 59.

The common electrode 72 further comprises rectangular openings or windows 72b formed respectively at the positions overlapped with the channel regions of the TFTs 45. For this reason, the whole channel region of the TFT 45 is exposed from the opening 72b in such a way as not to overlap with the common electrode 72. This is to avoid the change of the characteristics of the TFT 45 caused by the back gate effect. The opposite edges of the common electrode 72 formed by each opening 72b have a smaller width than the corresponding gate bus line 55, i.e., the gate electrode.

Figure 13:
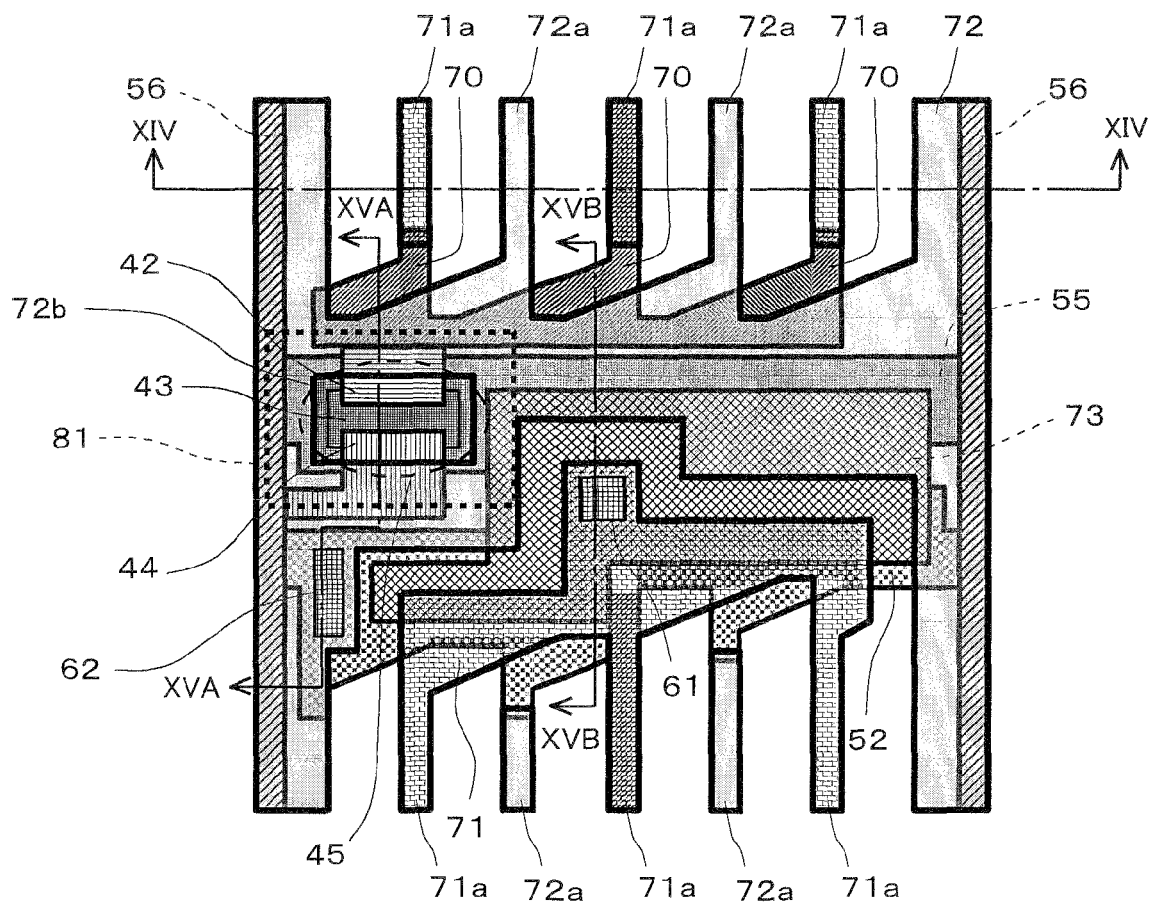
FIG. 13 is an enlarged partial plan view showing the detailed structure of the vicinity of the gate bus line of the lateral electric field type LCD device according to the first embodiment of FIG. 10.

As explained above, the common electrode 72 covers not only the whole surfaces of the drain bus lines 56 extending along the vertical direction of FIGS. 11 and 13 but also the surfaces of the gate bus lines 55 extending along the lateral direction of the same figures except for the openings 72b and the removed parts near the contact holes 61. To form the removed part, each of the edges 72c (which extend along the gate bus lines 55) of the common electrode 72 located on the side of the storage capacitor electrode 73 is bent to have steps. The removed part is covered with the storage capacitor electrode 73.

Moreover, similar to the related-art LCD device shown in FIGS. 4 to 10, the common electrode 72 is formed to cover not only the areas directly above the gate bus lines 55 but also the gaps between the gate bus lines 55 and the common bus lines 52 adjacent thereto (each of the adjacent common bus lines 52 is located in the subsequent pixel regions that are downwardly adjacent along the extension direction of the drain bus lines 56, i.e., the vertical direction), the gaps between the gate bus lines 55 and the corresponding source electrodes 42, the gaps between the gate bus lines 55 and the adjacent storage capacitor electrodes 73, and the peripheral areas of the edges of the source electrodes 42 and the adjacent storage capacitor electrodes 73. For this reason, the electric field generated near the gate bus lines 55 is shielded by the storage capacitor electrodes 73 in the areas that are covered with the storage capacitor electrodes 73 and by the common electrode 72 in the areas that are covered with the common electrode 72. Fringe electric field generated between the edges of the storage capacitor electrodes 73 and the adjacent gate bus lines 55 is shielded by the common electrode 72.

The gate bus lines 55 are placed in a lower layer than the storage capacitor electrodes 73 (i.e., a layer closer to the glass plate 11), and the common electrode 72 is placed in an upper layer than the storage capacitor electrodes 73 (i.e., a layer further from the glass plate 11). Moreover, as shown in FIG. 17, in the vicinity of each of the non-overlapped areas, the storage capacitor electrode 73 is overlapped with the corresponding gate bus line 55 in such a way as to exceed across the side edge 55b of the same gate bus line 55 from a lower position than the side edge 55b to an upper position than the same. However, the storage capacitor electrode 73 does not exceed across the side edge 55a of the same gate bus line 55 opposite to the side edge 55b. The common electrode 72 is overlapped with the same gate bus line 55 in such a way as to exceed across the side edge 55a of the same gate bus line 55 from an upper position than the side edge 55a to a lower position than the same. The common electrode 72 is partially overlapped with the storage capacitor electrode 73.

The reference numeral 81 shown in FIGS. 11 and 13 denotes the black matrix layer formed on the opposite substrate. The black matrix layer 81 comprises rectangular light-shielding regions provided for the respective pixel regions. Each of the light-shielding regions is defined by a rectangular broken line in FIGS. 11 and 13. Each of the light-shielding regions has a size that covers the whole TFT 45 and is isolated to have a rectangular island-like shape at a position right over the TFT 45. In this way, the occupation area of each light-shielding region of the black matrix layer 81 is restricted to a minimum necessary for preventing the entry of light into the TFT 45. The prevention of the entry of light into (the channel region of) the TFT 45 by the light-shielding region is to prevent the functions of the TFT 45 from being hindered due to the light.

With the lateral electric field type LCD device according to the first embodiment, as shown in FIGS. 13 and 17, the common electrode 72 comprises not only the openings or windows 72b but also the removed parts formed near the respective contact holes 61. The gate bus lines 55 are not covered with the common electrode 72 in the removed parts. For this reason, different from the related-art LCD device shown in FIGS. 4 to 10, the common electrode 72 does not have a shape covering the whole surfaces of the respective gate bus lines 55 except for the openings 72b. However, the non-overlapped areas of the gate bus lines 55 formed near the contact holes 61 (which are overlapped with the removed parts of the common electrode 72) are respectively covered with the storage capacitor electrodes 73 placed in a lower layer than the common electrode 72. Therefore, similar to the related-art LCD device shown in FIGS. 4 to 10, the electric filed generated in the vicinities of the gate bus lines 55 is shielded effectively by the cooperation of the storage capacitor electrodes 73 and the common electrode 72. As a result, even if the common electrode 72 comprises the removed parts near the contact holes 61, optical leakage will not occur near the contact holes 61.

Moreover, with the above-described related-art LCD device shown in FIGS. 4 to 10, since the electric filed generated in the vicinities of the gate bus lines 155 is shielded by the common electrode 172 alone placed in an upper layer than the gate bus lines 155, the degree of freedom in designing the pattern and layout of the constituent elements of the LCD device is limited. On the other hand, with the LCD device according to the first embodiment, the parts of the storage capacitor electrodes 73 are respectively overlapped with the gate bus lines 55 in such a way that the gate insulating film 57 intervenes between them. Therefore, the shape of the common electrode 72 is not limited to a shape covering the whole surfaces of the respective gate bus lines 55 (except for the openings 72b). This shape may be a shape including non-covering areas that do not cover the respective gate bus lines 55 in addition to the openings 72b according to the necessity. In this case, the storage capacitor electrodes 73 needs to be designed in such a way as to cover the non-overlapped areas of the gate bus lines 55.

In this way, with the LCD device according to the first embodiment, since the storage capacitor electrodes 73 are used for electric field shielding and light shielding, it is unnecessary that the common electrode 72 covers the whole surfaces of the respective gate bus lines 55 except for the openings 72b like the related-art LCD device shown in FIGS. 4 to 10. As a result, the degree of freedom in designing the constituent elements is increased.

Furthermore, because it is unnecessary that the common electrode 72 covers the whole surfaces of the respective gate bus lines 55 except for the openings 72b, the positions of the contact holes 61 and those of the ends of the pixel electrodes 71 can be shifted in due order toward the outer edges of the pixel regions. Therefore, compared with the related-art LCD shown in FIGS. 4 to 10, the aperture ratio can be easily improved, in other words, a higher aperture ratio can be easily realized.

Due to the improvement of the aperture ratio, if the amount of emitted light from the backlight unit is not changed, the luminance can be increased compared with the related-art LCD structure shown in FIGS. 4 to 10. If the luminance is not changed, the electric power consumption can be reduced compared with the related-art LCD structure shown in FIGS. 4 to 10 due to the same reason.

In addition, by properly adjusting the shape and/or the position of the storage capacitor electrodes 73, a desired storage capacitance can be ensured easily without lowering the aperture ratio or while improving the aperture ratio.

Next, supplemental explanation will be made with respect to the rectangular openings 72b of the common electrode 72 formed in the respective pixel regions.

With the LCD device according to the first embodiment, as explained above, each of the openings 72b of the common electrode 72 is formed in such a way that the whole channel region (i.e., the region of the semiconductor film 43 between the source electrode 42 and the drain electrode 44) of the TFT 45 is exposed from the common electrode 72. At the same time, the rectangular edges (which extend along the contour of the opening 72b) of the common electrode 72 formed by the opening 72b, which are located over the corresponding gate bus line 55, are entirely overlapped with the same gate bus line 55 at a location where the gate electrode of the TFT 45 is formed. In other words, the width of (the opposite edges of) the opening 72b, i.e., the distance between the opposite edges of the opening 72b along the drain bus lines 56, is sufficiently smaller than the width of the corresponding gate bus line 55 at a location where the gate electrode of the TFT 45 is formed (i.e., the width of the gate electrode). Accordingly, not only the change of the characteristics of the TFT 45 due to the back gate effect can be avoided but also the following advantage is obtained.

Specifically, even if the alignment direction of the liquid crystal molecules existing near the opening 72b is changed by the fringe electric field generated at the edges of the opening 72b, the incident light emitted from the backlight unit can be blocked by the gate bus lines 55 made of opaque metal. Therefore, optical leakage does not occur near the edges of the opening 72b regardless of the fringe electric field.

Because of the above-described reason, as shown in the LCD device of the first embodiment, the occupation area of each light-shielding region of the black matrix layer 81, which is formed on the opposite substrate, may be restricted to a minimum necessary for preventing the entry of external light from the outside (i.e., the opposite substrate side) into the TFT 145. Moreover, not only the size of the light-shielding region but also the Optical Density (OD) value of the light-shielding region may be restricted. Conventionally, to make sure that the light from the backlight unit is shielded, the OD value of the light-shielding region needs to be high. For example, the OD value needs to be equal to 4.0 or greater, or equal to 3.5 or greater. On the other hand, with the LCD device of the first embodiment, such the OD values as described here are not necessary and the OD value may be lowered. For example, the OD value may be lowered to 3.0 or less, or to approximately 2.0 or less. For this reason, with the LCD device of the first embodiment, the requirement for the black matrix layer 81 is relaxed. As a result, there is an advantage that the freedom of choice in selecting the material for the black matrix layer 81 can be expanded and/or the thickness of the black matrix layer 81 can be reduced. However, to prevent the functions of the TFT 45 from being hindered due to the irradiation of external light to the channel region thereof, it is preferred that the OD value of the lights shielding region is equal to 1.5 or greater.

With the related-art LCD device shown in FIGS. 4 to 10, the width (i.e., the inter-edge distance) of the opening 172b of the common electrode 172 along the drain bus lines 156 is not considered.

Furthermore, with LCD device according to the first embodiment, as shown in a second embodiment of the invention which will be explained below, the light-shielding region having a low OD value may be formed by overlapping at least two of the color layers that constitute a color filter without using the black matrix layer 81. In this case also, it is preferred that the OD value is equal to 1.5 or greater. In particular, it is preferred that shorter-wavelength light such as blue light is shielded as much as possible. Accordingly, if the light-shielding region is formed by overlapping at least two of the color layers that constitute a color filter, it is preferred that at least the color layer for the red pixel is placed at a position opposite to the channel region of the TFT 45.

The LCD device according to the first embodiment having the above-described configuration may be fabricated as follows, for example.

The active-matrix substrate is fabricated in the following way.

First, for example, a chromium (Cr) film is formed on the surface of the glass plate 11 and patterned to have a predetermined shape. Thus, the common bus lines 52 and the gate bus lines 55 having the shapes shown in FIG. 12A are simultaneously formed on the surface of the glass plate 11. Next, the gate insulating film 57, which is made of, for example, silicon nitride ($SiN_x$), is formed on the whole surface of the glass plate 11 to cover the common bus lines 52 and the gate bus lines 55.

Subsequently, the island-shaped semiconductor films 43 (which are usually made of amorphous silicon) for the TFTs 45 are formed on the gate insulating film 57 in such a way as to be overlapped with the underlying corresponding gate bus lines 55. Moreover, for example, a Cr film is formed on the gate insulating film 157 and patterned, thereby forming simultaneously the drain bus lines 56, the drain electrodes 44, the source electrodes 42, the storage capacitor electrodes 73, and the auxiliary pixel electrodes 70 on the gate insulating film 57. Thereafter, the protective insulating film 59, which is made of, for example, $SiN_x$, is formed on the gate insulating film 57, thereby covering the drain bus lines 56, the drain electrodes 44, the source electrodes 42, the storage capacitor electrodes 73, and the auxiliary pixel electrodes 70.

Following this, the rectangular contact holes 61 penetrating through the protective insulating film 59 and the rectangular contact holes 62 penetrating through the protective insulating film 59 and the gate insulating film 57 are formed. Thereafter, a transparent conductive film made of ITO is formed on the protective insulating film 59 and patterned, thereby forming the pixel electrodes 71 and the common electrode 72 on the protective insulating film 59. At this time, the pixel electrodes 71 are electrically connected to the corresponding source electrodes 42 by way of the corresponding contact holes 61. The common electrode 72 is electrically connected to the respective common bus lines 52 by way of the corresponding contact holes 62. In this way, the active-matrix substrate is fabricated.

The opposite (color filter) substrate is fabricated in the following way.

First, the color layers 82R, 82G, and 82B of the three primary colors for the color filter and the black matrix layer 81 for light shielding are selectively formed on the surface of the glass plate 12. Thereafter, the overcoat layer 85 is formed on the whole surface of the glass plate 12 in such a way as to cover the black matrix layer 81 and the color layers 82R, 82G, and 82B. Then, the columnar spacers (not shown) are formed on the overcoat layer 85. In this way, the opposite substrate is fabricated.

Following this, the alignment films 31 and 32, which are made of polyimide, are respectively formed on the surface of the active-matrix substrate and the surface of the opposite substrate fabricated respectively in the above-described manners. The surfaces of the alignment films 31 and 32 are uniformly subjected to the predetermined aligning treatments, respectively.

Thereafter, the active-matrix substrate and the opposite substrate are superposed on each other to have a predetermined gap and then, the outer edges of the two substrates are sealed by a sealing material except for the liquid crystal injection hole. Subsequently, in a vacuum chamber, a predetermined liquid crystal material is injected into the space between the two substrates through the liquid crystal injection hole and thereafter, the liquid crystal injection hole is closed. After the coupling and uniting operations of the substrates are completed in this way, the polarizer plates (not shown) are respectively adhered onto the outer surfaces of the substrates. As a result, the LCD panel is completed.

A predetermined driver LSI (Large-Scale Integrated Circuit) and a predetermined backlight unit are mounted on the LCD panel thus fabricated. As a result, the LCD device according to the first embodiment shown in FIGS. 11 to 17 is completed.

With the lateral electric field type LCD device according to the first embodiment, as explained above, the degree of freedom in designing the constituent elements of the LCD device can be increased and at the same time, the aperture ratio can be improved easily compared with the related-art LCD structure shown in FIGS. 4 to 10. Moreover, because of the improvement of the aperture ratio, if the amount of emitted light from the backlight unit is not changed, the luminance can be increased compared with the related-art LCD structure shown in FIGS. 4 to 10. If the luminance is not changed, the electric power consumption can be reduced compared with the related-art LCD structure shown in FIGS. 4 to 10.

Second Embodiment

Figure 18:
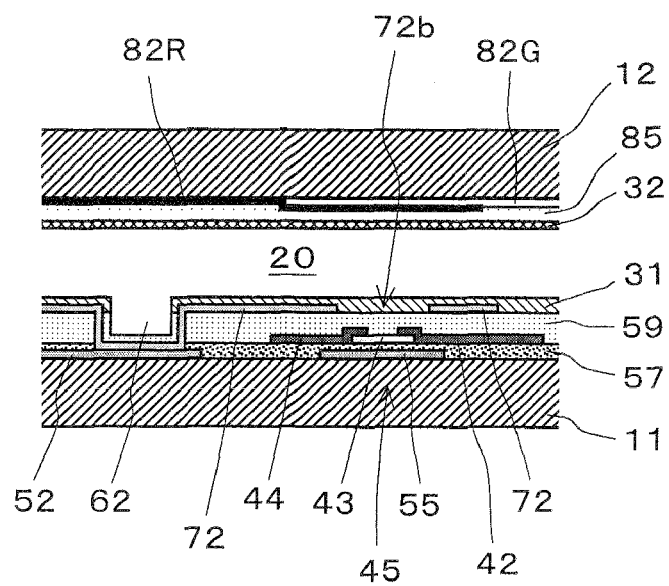
FIG. 18 is a partial cross-sectional view of a lateral electric field type LCD device according to a second embodiment of the present invention along the line XVA-XVA in FIG. 13.

The structure of a lateral electric field type LCD device according to a second embodiment of the invention is shown in FIG. 18.

FIG. 18 is a partial cross-sectional view of the LCD device according to the second embodiment along the line XVA-XVA in FIG. 13, which is similar to FIG. 15A.

The structure of the LCD device according to the second embodiment is the same as that of the LCD device according to the above-described first embodiment except that the light-shielding regions are formed on the opposite substrate by overlapping two of the color layers that constitute a color filter instead of forming the black matrix layer 81.

As shown in FIG. 18, at the predetermined positions on the opposite substrate to be superposed on the TFTs 45, in other words, at the positions where the light-shielding resions of the black matrix layer 81 shown in FIG. 13 should be formed, the red color layer 82R and the green color layer 82G are overlapped with each other to form light-shielding regions with an increased light-shielding performance. Such the light-shielding region is not limited to the combination of the red and green color layers 82R and 82G; it may be formed by the combination of other color layers. For example, the light-shielding region may be the combination of the red and blue color layers 82R and 82B or that of the green and blue color layers 82G and 82B. This light-shielding region may be the combination of the three layers, i.e., the red, green, and blue color layers 82R, 82G, and 82B.

Such the light-shielding region may be easily formed by the known method disclosed in the Patent Document 3 or 4, for example.

According to the inventors' test, in the case where the light-shielding region was formed by the combination of the red, green, and blue color layers 82R, 82G, and 82B, the OD value was approximately 1.9 when the color specification was defined to display the chromaticity range of 40% with respect to the NTSC (National Television System Committee) standard.

When the color specification was defined to display the chromaticity range of 60% with respect to the NTSC standard using the same light-shielding region as above, the OD value was approximately 2.3. In these two cases, no optical leakage was observed in the vicinities of the gate bus lines 55 and those of the TFTs 45.

Moreover, regarding the effects by incident light from the external environment, any malfunction such as unusual operation of the TFTs 45 was not observed even if the LCD device according to the second embodiment was placed in a severe environment where the illuminance value on the display screen of the LCD device was able to reach approximately 100,000 lux.

As explained above, the LCD device according to the second embodiment of the invention is the same in structure as the above-described LCD device according to the first embodiment except for the structure on the opposite substrate and therefore, it is apparent that the same advantages as those of the first embodiment are obtained for the device of the second embodiment.

In addition, since the LCD device according to the second embodiment does not comprise the black matrix layer 81, in other words, this LCD device has a black matrix (BM) less structure, synergistic advantages are obtained. Specifically, the formation processes of the black matrix layer 81 can be omitted for realizing the fabrication cost reduction without degrading conspicuously the display quality such as display contrast and cross talk. This is due to the following reason:

In the case where a LCD device has a BM-less structure, if the alignment direction of the liquid crystal molecules is affected by the leaked electric field from the vicinities of the gate bus lines 55 and/or those of the TFTs 45, usually, there arises apprehension of contrast lowering and/or cross talk characteristics degradation. This is because optical leakage occurs due to unwanted change of the alignment direction of the liquid crystal molecules in these vicinities. With the structure according to the second embodiment of the invention, however, the optical leakage due to unwanted change of the alignment direction of the liquid crystal molecules in the vicinities of the gate bus lines 55 and the TFTs 45 can be surely avoided. Therefore, even if the LCD device has a BM-less structure, the fabrication cost can be lowered without degrading the display quality.

Furthermore, since the light-shielding region formed by overlapping the color layers may be restricted to a minimum size at a position corresponding to the channel region of the TFT 45, no broadened level difference is formed. Therefore, the problem that the alignment of the liquid crystal molecules is affected by the light-shielding region and that the time for the injection process of the liquid crystal material is prolonged can be avoided. In this way, aperture ratio improvement and fabrication cost reduction can be realized simultaneously.

Other Embodiments

Since the above-described first and second embodiments are embodied examples of the present invention, it is needless to say that the present invention is not limited to these embodiments. Any other modification is applicable to these embodiments.

For example, the shape or pattern of the storage capacitor electrode 73 may be optionally changed according to the shape or pattern of the non-overlapped area of the gate bus line 55 that is not overlapped with the common electrode 72.

Moreover, the structure of the LCD device may be optionally changed except that (i) the drain bus lines 56 are entirely covered with the common electrode 72, (ii) the gate bus line 55 corresponding to each of the pixel regions is covered with the common electrode 72 except for the predetermined non-overlapped area existing in the part that does not overlap with the corresponding TFT 45, and (iii) the predetermined non-overlapped area of the gate bus line 55 corresponding to each of the pixel regions is covered with the storage capacitor electrode 73 corresponding to the adjacent pixel region.

Although the common electrode 72 is provided for all the pixel regions in the first and second embodiments, the invention is not limited to this. A plurality of the common electrodes 72 may be provided. For example, the common electrodes 72 may be provided for the pixel regions in a one-to-one correspondence.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A lateral electric field type liquid crystal display device comprising:
    a first substrate and a second substrate placed opposite to each other at an approximately constant gap;
    a liquid crystal layer formed between the first substrate and the second substrate;
    drain bus lines formed on the first substrate;
    gate bus lines formed on the first substrate in such a way as to be intersected with the drain bus lines;
    pixel regions defined in a matrix array by the drain bus lines and the gate bus lines;
    at least one first liquid crystal driving electrode and second liquid crystal driving electrodes formed on the first substrate;
    thin-film transistors formed on the first substrate for the respective pixel regions; and
    storage capacitor electrodes formed on the first substrate for the respective pixel regions;
    wherein an alignment direction of liquid crystal molecules existing in the liquid crystal layer is rotated in planes approximately parallel to the first substrate and the second substrate by applying liquid crystal driving electric field to the liquid crystal layer using the at least one first liquid crystal driving electrode and the second liquid crystal driving electrodes, thereby displaying images;
    the drain bus lines are entirely covered with the at least one first liquid crystal driving electrode;
    the gate bus line corresponding to each of the pixel regions is covered with the at least one first liquid crystal driving electrode except for a predetermined non-overlapped area existing in a part that does not overlap with the corresponding thin-film transistor; and
    the predetermined non-overlapped area of the gate bus line corresponding to each of the pixel regions is covered with the storage capacitor electrode corresponding to the adjacent pixel region.

2. The liquid crystal display device according to claim 1, wherein the gate bus line corresponding to each of the pixel regions is placed in a lower layer than the corresponding storage capacitor electrode; and
    the at least one first liquid crystal driving electrode is placed in an upper layer than the corresponding storage capacitor electrode;
    and wherein in a vicinity of each of the non-overlapped areas, the storage capacitor electrode is overlapped with the adjacent gate bus line in such a way as to exceed across a first side edge of the same gate bus line, and the at least one first liquid crystal driving electrode is overlapped with the same gate bus line in such a way as to exceed across a second side edge thereof opposite to the first side edge.

3. The liquid crystal display device according to claim 2, wherein the at least one first liquid crystal driving electrode is partially overlapped with the corresponding storage capacitor electrode in each of the non-overlapped areas.

4. The liquid crystal display device according to claim 2, wherein the at least one first liquid crystal driving electrode does not exceed across the first side edge of the gate bus line in each of the non-overlapped areas.

5. The liquid crystal display device according to claim 1, wherein the at least one first liquid crystal driving electrode comprises openings formed in such a way as to expose channel regions of the thin-film transistors, respectively.

6. The liquid crystal display device according to claim 5, wherein opposite edges formed by each of the openings of the at least one first liquid crystal driving electrode have a smaller width than the corresponding gate bus line.

7. The liquid crystal display device according to claim 1, further comprising light-shielding regions formed on the second substrate at positions opposite to channel regions of the thin-film transistors;
    wherein each of the light-shielding regions has an isolated pattern; and
    the light-shielding regions are formed corresponding to the respective pixel regions.

8. The liquid crystal display device according to claim 7, wherein the light-shielding regions are formed by overlapping at least two of color layers that constitute a color filter.

9. The liquid crystal display device according to claim 7, wherein the light-shielding regions have an optical density (OD) value that is equal to 1.5 or greater and that is equal to 3.0 or less.

* * * * *